(12) United States Patent
Nozaki et al.

(10) Patent No.: US 6,243,353 B1
(45) Date of Patent: Jun. 5, 2001

(54) RECORDING/PLAYBACK APPARATUS USING RECORDING RESERVATION INFORMATION WRITTEN ONTO RECORDING MEDIUM

(75) Inventors: Mitsuyuki Nozaki, Tokyo; Hideki Mimura, Yokohama; Masafumi Tamura, Tokyo; Shinichi Kikuchi; Kazuhiko Taira, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/233,026

(22) Filed: Jan. 20, 1999

(30) Foreign Application Priority Data

Jan. 21, 1998 (JP) .................................................. 10-009900

(51) Int. Cl.[7] .............................. G11B 7/24; G11B 17/22
(52) U.S. Cl. .......................................... 369/275.3; 369/32

(58) Field of Search ............................... 369/275.3, 275.1, 369/275.4, 32, 13, 288, 47.1; 360/27, 15, 55, 57, 60; 386/46, 95, 83

(56) References Cited

U.S. PATENT DOCUMENTS 5,361,173 * 11/1994 Ishii et al. ............................... 360/27

FOREIGN PATENT DOCUMENTS 6-20382      1/1994  (JP) .

* cited by examiner

Primary Examiner—Ali Neyzari
(74) Attorney, Agent, or Firm—Oblon, Spivak, McClelland, Maier & Neustadt, P.C.

(57) ABSTRACT

A recording medium has a management area and a data area. Information pertaining to recording reservation is recorded in the management area so as to be displayable in the form of an image. A recording/playback apparatus for recording and reproducing information with respect to the recording medium reads out information pertaining to recording reservation from the recording medium and executes reservation recording on the basis of the read out information.

10 Claims, 20 Drawing Sheets

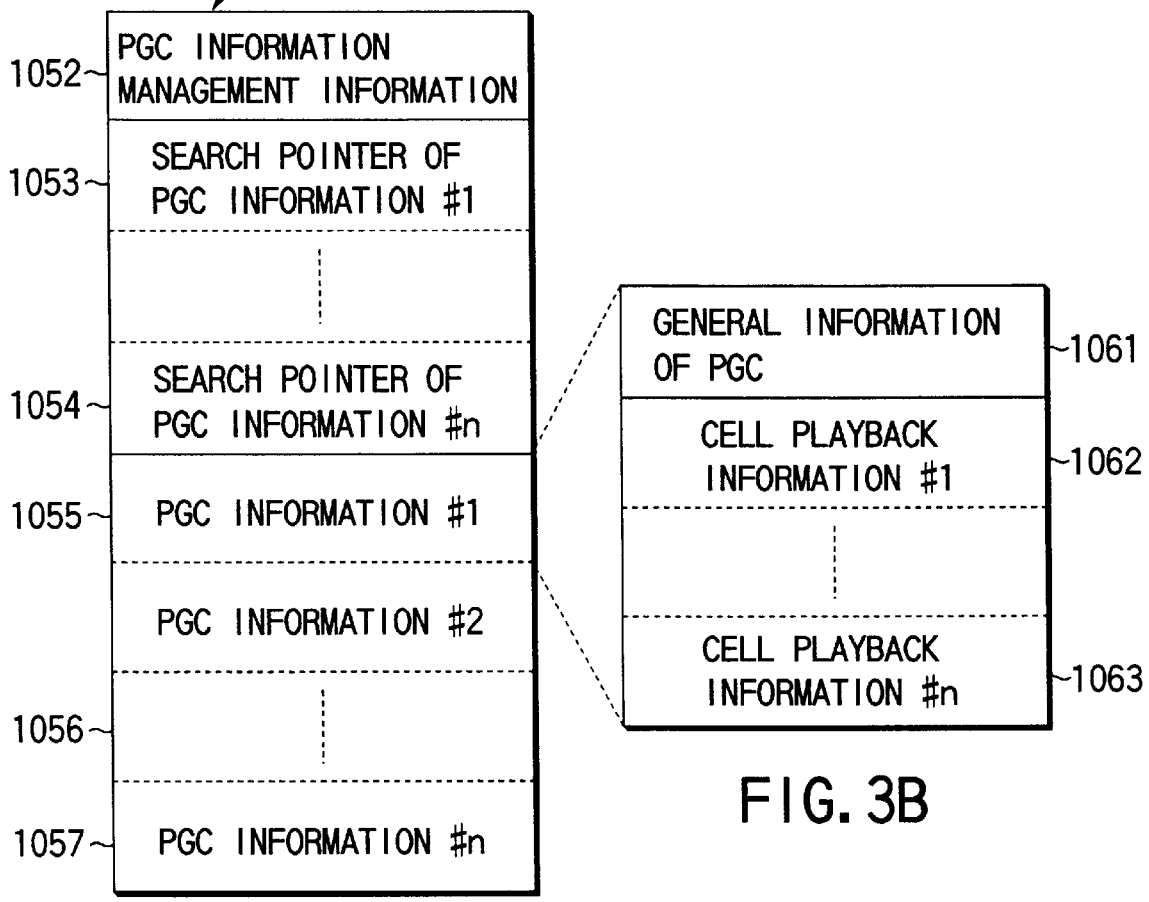
FIG. 3A
FIG. 3B
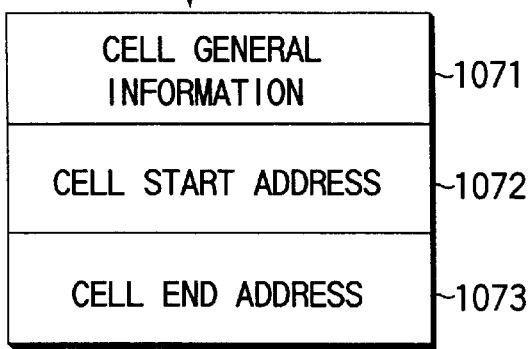
FIG. 4

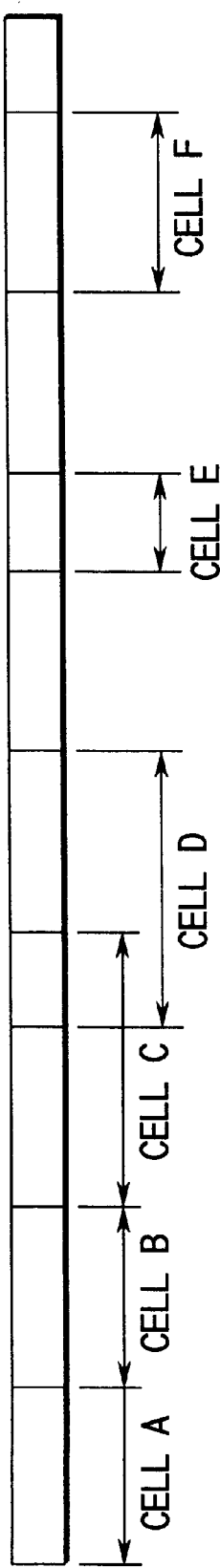

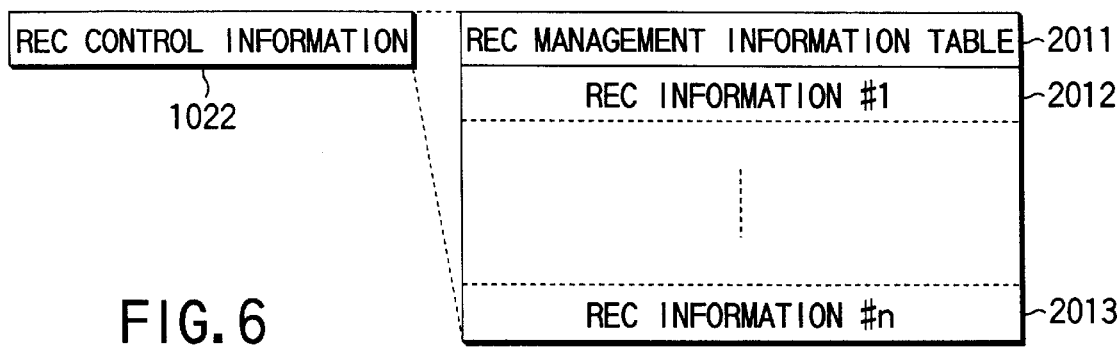

FIG. 6

REC MANAGEMENT INFORMATION TABLE 2011

| CONTENTS | NUMBER OF BYTES |
|---|---|
| NUMBER OF PIECES OF REC RESERVATION INFORMATION | 2 BYTES |
| ⋮ | |

FIG. 7

REC RESERVATION INFORMATION #n

| CONTENTS | NUMBER OF BYTES |
|---|---|
| (a) LENGTH OF PROGRAM NAME | 1 BYTE |
| (b) PROGRAM NAME | 255 BYTES |
| (c) REC INFORMATION FORMATION DATE | 4 BYTES |
| (d) RECORDING MODE | 2 BYTES |
| (e) CHANNEL NUMBER | 2 BYTES |
| (f) RECORDING DAY | 2 BYTES |
| (g) RECORDING DATE | 4 BYTES |
| (h) START TIME | 2 BYTES |
| (i) END TIME | 2 BYTES |
| (j) REC GROUP NUMBER | 2 BYTES |
| (k) REC PROGRAM CHAIN ID | 4 BYTES |

RECORDING DAY

| b15 | | | b12 | b11 | | | b8 |
|---|---|---|---|---|---|---|---|
| VALID PERIOD | | | | VALID WEEK | | | |

| b7 | | | | | | | b0 |
|---|---|---|---|---|---|---|---|
|  | SUNDAY | MONDAY | TUESDAY |  | THURSDAY | FRIDAY | SATURDAY |

EVERY DAY     WEDNESDAY

VALID PERIOD { 1h~Eh; 1~14WEEKS
                 Fh; INDEFINITE PERIOD

VALID WEEK { 1h~5h; 1~5WEEKS
               Fh; EVERY WEEK

FIG. 13

RECORDING DATE

| b31 | b28 | b27 | b24 |
|---|---|---|---|
| YEAR (THOUSANDS DIGIT) | | YEAR (HUNDREDS DIGIT) | |

| b23 | b20 | b19 | b16 |
|---|---|---|---|
| YEAR (TENS DIGIT) | | YEAR (UNITS DIGIT) | |

| b15 | b12 | b11 | b8 |
|---|---|---|---|
| MONTH (TENS DIGIT) | | MONTH (UNITS DIGIT) | |

| b7 | b4 | b3 | b0 |
|---|---|---|---|
| DAY (TENS DIGIT) | | DAY (UNITS DIGIT) | |

FIG. 14

START TIME, END TIME

| b15 | b12 | b11 | b8 |
|---|---|---|---|
| HOUR (TENS DIGIT) | | HOUR (UNITS DIGIT) | |

| b7 | b4 | b3 | b0 |
|---|---|---|---|
| MINUTE (TENS DIGIT) | | MINUTE (UNITS DIGIT) | |

FIG. 16A

| | | |
|---|---|---|
| RESERVATION INFORMATION #1 | (f) RECORDING DAY<br>(j) RECORDING GROUP NUMBER<br>(k) RECORDING PROGRAM CHAIN ID | :EVERY WEEK<br>:1<br>:00000001h |
| RESERVATION INFORMATION #2 | (f) RECORDING DAY<br>(j) RECORDING GROUP NUMBER<br>(k) RECORDING PROGRAM CHAIN ID | :EVERY WEEK<br>:2<br>:00000002h |
| RESERVATION INFORMATION #3 | (f) RECORDING DAY<br>(j) RECORDING GROUP NUMBER<br>(k) RECORDING PROGRAM CHAIN ID | :EVERY WEEK<br>:3<br>:00000003h |

FIG. 16B

PGC#1 (00000001h)

| REC#1 (1W) | REC#1 (2W) | REC#1 (3W) | ...... |

FIG. 16C

PGC#2 (00000002h)

| REC#2 (1W) | REC#2 (2W) | REC#2 (3W) | ...... |

FIG. 16D

PGC#2 (00000003h)

| REC#3 (1W) | REC#3 (2W) | REC#3 (3W) | ...... |

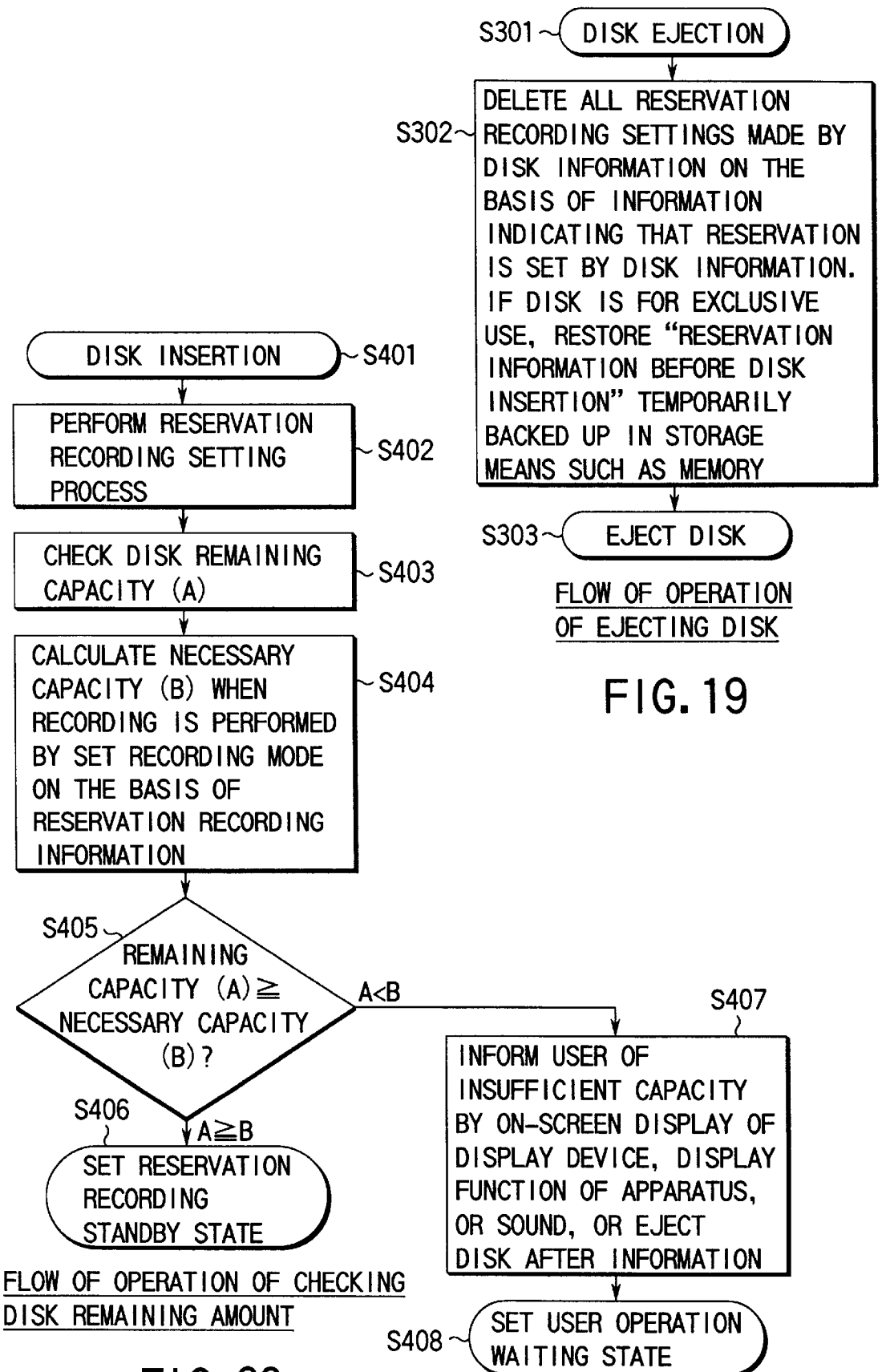

FIG. 23 FLOW OF OPERATION OF SETTING AND CHANGING RESERVATION INFORMATION

RECORDING/PLAYBACK APPARATUS USING RECORDING RESERVATION INFORMATION WRITTEN ONTO RECORDING MEDIUM

BACKGROUND OF THE INVENTION

The present invention relates to a recording medium and recording/playback apparatus capable of recording and reproducing recording reservation information and, more particularly, to an apparatus which can be effectively incorporated into a digital video disk recording/playback apparatus.

As is well known, moving picture optical disk playback apparatuses capable of reproducing optical disks recording, e.g., video and audio data have been developed recently. For example, LDs (Laser Disks) and video CDs (Compact Disks) are finding widespread use for movie software, karaoke, and the like.

At present, a DVD (Digital Video Disk) video standard based on an AC-3 audio compression method has been proposed by using the internationally standardized MPEG (Moving Picture Image Coding Experts Group) 2 method.

This DVD video standard supports MPEG2 as a moving image compression method and AC-3 audio, MPEG audio, and linear PCM (Pulse Code Modulation) as audio compression methods in accordance with MPEG2 system layers. Additionally, the DVD video standard includes sub-picture data, for a caption, which is obtained by run-length-compressing bitmap data, and control data (navigation data) for special playback such as fast forward playback and fast rewind playback.

This DVD video standard also supports ISO (International Organization for Standardization) 9660 and micro UDF (Universal Disk Format) to allow computers to read data.

After that, a DVD-RAM (Random Access Memory) has been announced and rewritable optical disks having capacities such as 2.6 Gbytes (Gigabytes) and 4.7 Gbytes have been realized.

These technologies are beginning to realize recording and playback of video signals with respect to optical disks.

Meanwhile, VTRs (Video Tape Recorders) are currently widely used as means for recording video and audio signals. These VTRs have very high cost performance because the running cost with respect to the recorded information amount is low.

On the other hand, an optical disk as a recording medium represented by a DVD-RAM is required to be able to record computer data and disk management information in addition to video data.

It is expected by using the superiority of a disk over a VTR to realize new functions which have been impossible.

One of these new functions is program reservation recording. To realize this reservation recording, recording reservation must be performed before that. Conventionally, various improvements such as a G code system have been made to simplify recording reservation. However, settings for recording reservation are still considerably cumbersome.

Additionally, to make a collection of a certain program by sequentially recording episodes of the program in a single optical disk, it is necessary to perform inefficient operations of managing the correspondence between optical disks and such programs and performing recording reservation each time a program of interest is broadcast.

BRIEF SUMMARY OF THE INVENTION

The present invention has been made in consideration of the above situation, and has as its object to provide a recording medium which can record reservation (recording reservation) information of recording, i.e., recording reservation information or by which a recording/playback apparatus automatically starts up in accordance with reservation information and performs reservation recording.

It is another object of the present invention to provide a recording/playback apparatus which accesses the recording medium and records or reproduces reservation information.

It is still another object of the present invention to provide a recording/playback apparatus capable of accessing a recording medium and performing reservation recording on the basis of reservation information recorded on the recording medium.

A recording medium according to the present invention has a management area and a data area. Information pertaining to recording reservation is recorded in the management area so as to be displayable in the form of an image.

Also, a recording/playback apparatus according to the present invention records and reproduces information with respect to a recording medium. The apparatus includes control means for reading information pertaining to recording reservation, which is recorded on the recording medium so as to be displayable in the form of an image, and executing a reservation recording operation on the basis of this information.

In the above arrangements, the information pertaining to recording reservation is recorded on the recording medium. Therefore, reservation recording of a program can be efficiently performed with a high degree of freedom.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are views for explaining details of a program chain information table in the optical disk data structure;

FIG. 4 is a view for explaining details of cell playback information in the program chain information table;

FIGS. 5A to 5D are views for explaining the relationships between cell arrays and program chain information;

FIG. 6 is a view for explaining details of recording control information in the optical disk data structure;

FIG. 7 is a view for explaining details of a recording management information table in the recording control information;

FIG. 8 is a view for explaining detailed items of recording reservation information in the recording control information;

FIG. 12 is a view for explaining the detailed contents of recording day information in the recording reservation information;

FIG. 13 is a view for explaining the detailed contents of recording date information in the recording reservation information;

FIG. 14 is a view for explaining the detailed contents of start time•end time information in the recording reservation information;

FIGS. 16A to 16D are views for explaining another example of the recording reservation information and an image of a recording array based on the information;

FIG. 19 is a flow chart for explaining an operation of the recording/playback apparatus when the disk is removed;

FIG. 20 is a flow chart for explaining an operation performed by the recording/playback apparatus to check the disk remaining amount;

DETAILED DESCRIPTION OF THE INVENTION

Figure 1:
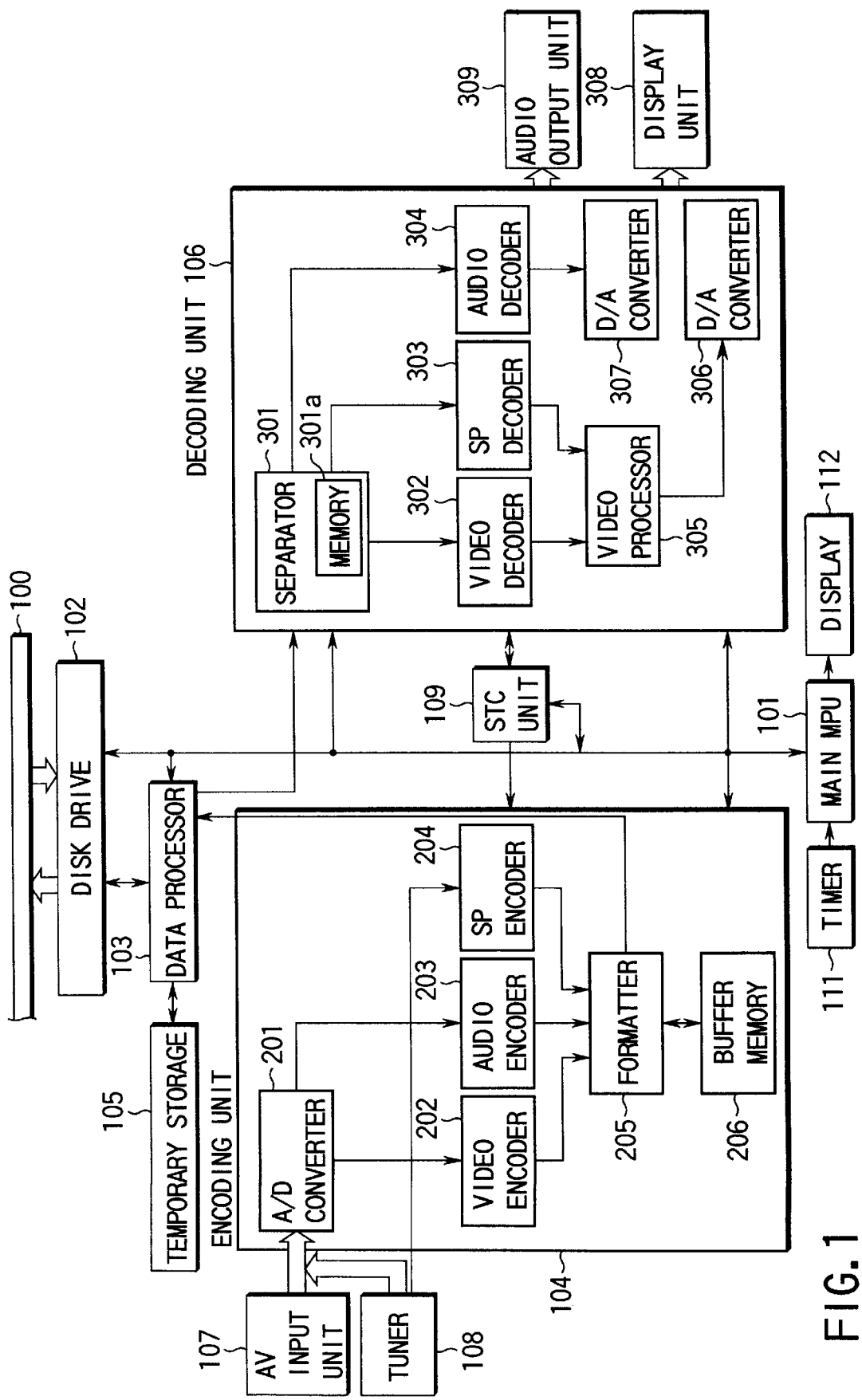
FIG. 1 is a block diagram showing an example of a recording/playback apparatus for recording and reproducing data with respect to an optical disk.

One embodiment of the present invention will be described in detail below with reference to the accompanying drawing. FIG. 1 shows the entire arrangement of a recording/playback apparatus explained in this embodiment. In this recording/playback apparatus, the following units operate with respect to an optical disk 100 as a recording medium. That is, a main MPU (Microprocessing Unit) 101 generally controls the whole recording/playback apparatus.

A disk drive 102 includes functions of controlling the rotation of the optical disk 100, reading out data from the optical disk 100, and writing data in the optical disk 100 on the basis of commands from the main MPU 101. The rotation of the optical disk 100 is controlled via a disk motor servo unit. Data is read out from and written in the optical disk 100 via an optical head using optical means which handles a laser beam.

To record recording data from an encoding unit 104 into the optical disk 100, a data processor 103 adds an error correction code to the recording data whose unit is 16 sectors. Also, the data processor 103 modulates the recording data to form a recording signal and supplies the recording signal to the disk drive 102. The data processor 103 is connected to a temporary storage 105. This temporary storage 105 temporarily stores data whose amount corresponds to a few minutes in high-speed playback.

To reproduce data, the data processor 103 receives a playback signal from the disk drive 102, demodulates the signal, performs error correction for the signal, and supplies the demodulated signal to a decoding unit 106.

The encoding unit 104 receives external inputs. That is, both of an AV (Audio Video) input unit 107 and a tuner 108 can supply audio and video signals to the encoding unit 104. The tuner 108 can also apply character information and closed caption data as information of a vertical blanking period to the encoding unit 104.

The received audio and video signals are supplied to an A/D (Analogue/Digital) converter 201 in the encoding unit 104. The A/D converter 201 converts the video and audio signals into digital video and audio signals and supplies the digital video and audio signals to a video encoder 202 and an audio encoder 203, respectively. Also, the character information and closed caption information are applied to an SP (Sub-Picture) encoder 204. The encoded video data, audio data, and SP data are supplied to a formatter 205 where the data are packeted and packed for recording. A buffer memory 206 is used to temporarily hold these data.

The encoders 202, 203, and 204 described above use a system time clock as a reference of the time of the whole corresponding file and determine the PTS (Presentation Time Stamp) and DTS (Decoding Time Stamp) of each packet on the basis of the value.

An STC (System Time Clock) unit 109 generates this system time clock. To add information necessary during playback, the formatter 205 can also align packs for each predetermined video unit (GOP: Group of Picture) (e.g., a playback time of about 0.5 to 1.0 sec) and add a navigation pack (NV pack: usable as management information) to the head of the GOP. At the end of data recording, the data processor 103 records the addresses of front and rear NV packs in a data area for fast forward playback and fast rewind playback in each NV pack and records other necessary pieces of management information in a management area.

The decoding unit 106 receives a pack string as playback data from the data processor 103. This pack string is supplied to a separator 301. The separator 301 checks each pack and transfers a video packet, sub-picture packet, and audio packet to a video decoder 302, a sub-picture (SP) decoder 303, and an audio decoder 304, respectively.

The NV packs are stored one after another in an internal memory 301a of the separator 301 so that the main MPU 101 can access any time.

When the separator 301 transfers the packets to the corresponding decoders 302, 303, and 304, the PTS or DTS is transferred and loaded in the STC unit 109 at a designated specific timing to set the reference time of the whole apparatus. For example, the main MPU 101 loads the internal PTS of the NV pack into the STC unit 109, or the video decoder 302 automatically sets the DTS or PTS of the video data into the STC unit 109.

After that, the decoders 302, 303, and 304 perform decoding and playback while maintaining the synchronism by comparing the PTS in the packet with the system clock.

The video data decoded by the video decoder 302 and the SP data decoded by the SP decoder 303 are supplied to a video processor 305 where these data are synthesized. Outputs from the video processor 305 and the audio decoder 304 are converted into analog signals by D/A (Digital/Analogue) converters 306 and 307 and supplied to a display unit 308 and an audio output unit 309, respectively.

The main MPU 101 is connected to a timer 111 and a display 112. The main MPU 101 can receive date information and time information from the timer 111 and use these pieces of information for recording reservation. Also, the main MPU 101 can display the time information and recording reservation information on the display 112. It is also possible to supply the recording reservation information from the main MPU 101 to the display unit 308 via the decoding unit 106 and display the information on the display unit 308.

The main MPU 101 collectively manages the whole apparatus and controls recording and playback. The main MPU 101 further controls reservation information as the characteristic feature of the present invention. Methods of recording and using the reservation information will be described later.

Figure 2A:
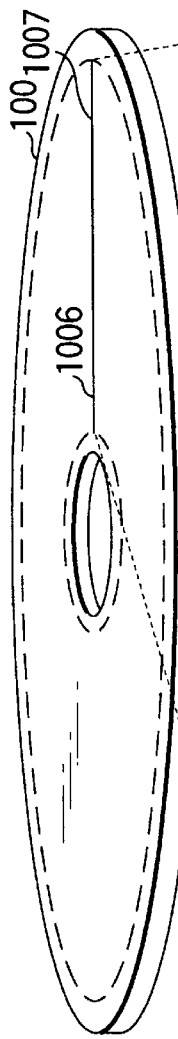
FIGS. 2A to 2E are views for explaining an example of the data structure of an optical disk.

FIGS. 2A to 2E show an outline of the optical disk 100. FIG. 2A shows the external appearance of an information storage medium, i.e., the optical disk 100, capable of recording and reproducing picture information and/or music information. An outline of the contents (data structure) of information to be recorded on this optical disk 100 is as follows.

Figure 2B:

As shown in FIG. 2B, a lead-in area 1002, a volume & file manager information area 1003, a data area 1004, and a lead-out area 1005 are formed in this order from an inner periphery 1006 to an outer periphery 1007 of the optical disk 100.

The lead-in area 1002 has an embossed data zone with a roughened light reflecting surface, a mirror zone with a flat surface (mirror surface), and a rewritable data zone in which information is rewritable.

The volume & file manager information area 1003 is a rewritable data zone recordable and rewritable by a user. In this area 1003, a file of audio & video data or information pertaining to the whole volume is recorded.

The data area 1004 is a rewritable data zone recordable and rewritable by a user. The lead-out area 1005 is also a rewritable data zone in which information is rewritable.

The contents of information recorded in each zone are as follows.

The embossed data zone of the lead-in area 1002 prerecords information pertaining to a whole information storage medium, e.g., the disk type such as DVD-ROM, DVD-RAM, or DVD-R, disk size, recording density, and physical sector numbers indicating the recording start/recording end positions information pertaining to the recording•playback•erase characteristics, e.g., the recording power, recording pulse width, erase power, playback power, recording linear speed, and erase linear speed.

information pertaining to the manufacture of each information recording medium, e.g., the product number.

Each of the rewritable data zone of the lead-in area 1002 and the rewritable data zone of the lead-out area 1005 has a recording area for the unique disk name of each information storage medium a trial recording area (for checking the recording•erase conditions)

a management information recording area pertaining to a defective area in the data area 1004

The information recording/playback apparatus can record information in the above areas.

Figure 2C:
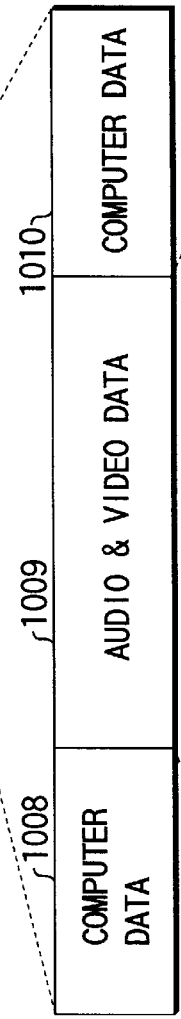

As shown in FIG. 2C, the data area 1004 between the lead-in area 1002 and the lead-out area 1005 can record both computer data and audio & video data. The recording order and recording information sizes of these computer data and audio & video data can be freely set. Areas in which the computer data is recorded are called computer data files 1008 and 1010. An area in which the audio & video data is recorded is called an audio & video data file 1009.

Figure 2D:
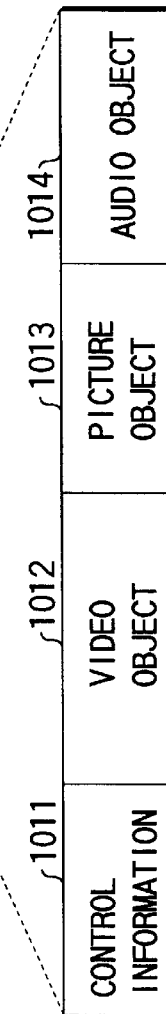
Figure 2E:
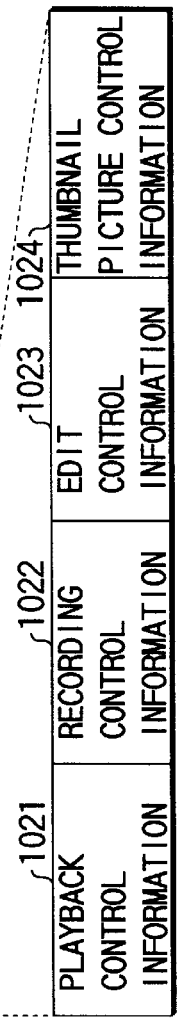

As shown in FIG. 2D, the data structure of information recorded in the audio & video data file 1009 includes control information . . . control information (a file 1011) necessary to perform recording (video and audio), playback, edit, and search video object . . . recording information (a file 1012) of the contents of video data picture object . . . information (a file 1013) of an object of playback in a still image such as a still or slide or in video data, and a thumbnail picture for search or edit audio object . . . recording information (a file 1014) of the contents of audio data As shown in FIG. 2E, the contents of the control information are playback control information . . . control information (a file 1021) necessary to perform playback recording control information . . . control information (a file 1022) necessary to perform recording (video and audio)

edit control information . . . control information (a file 1023) necessary to perform edit thumbnail picture control information . . . management information (a file 1024) pertaining to a thumbnail picture for searching for or editing an object of playback in video data FIG. 3A shows the internal data structure of the playback control information shown in FIG. 2E. This playback control information has a data structure indicated by a program chain (PGC) information table 1051. The playback order is determined by a program chain and a cell. The program chain is a unit for executing a series of playback operations in which the cell playback order is designated. The cell is a playback section in which playback data is designated by the start and end addresses.

The PGC information table 1051 contains PGC information management information 1052, one or more search pointers 1053 of PGC information, and pieces of PGC information 1055, 1056, and 1057.

The PGC information management information 1052 contains the number of PGC information indicating the number of program chains. Also, the search pointers 1053 and 1054 of PGC information point the start positions of description of the corresponding pieces of PGC information. This allows the disk drive 102 to easily search for a program chain of interest.

As shown in FIG. 3B, each of the pieces of PGC information 1055, 1056, and 1057 contains PGC general information 1061 and one or more pieces of cell playback information 1062 and 1063. The PGC general information 1061 contains the number of cell playback information indicating the playback time and the number of cells of this program chain.

FIG. 4 shows the contents of the pieces of cell playback information 1062 and 1063. Each cell playback information contains cell general information 1071, a cell start address 1072, and a cell end address 1073. The cell general information 1071 contains general information such as a cell playback time. The cell start address 1072 and the cell end address 1073 describe the start and end addresses, respectively, of a data section to be reproduced as a cell.

FIG. 5A shows an example of the cell recorded state. FIGS. 5B, 5C, and 5D show examples of PGC information PGCI#1, PGCI#2, and PGCI#3, respectively.

Referring to FIG. 5A, a playback section from a cell A to a cell F is designated, and PGC information is defined in each program chain.

The PGC information PGCI#1 shown in FIG. 5B indicates a continuous playback section composed of designated cells. The playback order is cell A→cell B→cell C.

The PGC information PGCI#2 shown in FIG. 5C indicates a discontinuous playback section composed of designated cells. The playback order is cell D→cell E→cell F.

The PGC information PGCI#3 shown in FIG. 5D indicates that random playback is possible regardless of the playback direction and duplication. The playback order is cell E→cell A→cell D→cell B→cell E.

The recording control information 1022 (FIG. 2E) will be described in detail below. The recording medium and apparatus of the present invention can perform recording reservation and for that purpose have control and management information file areas in which various pieces of information are recorded.

FIG. 6 shows the detailed contents of the recording control information 1022. The recording control information 1022 includes a recording (REC) management information table 2011 and a plurality of pieces of REC information 2012 and 2013. These pieces of REC information 2012 and 2013 are a variety of pieces of information, e.g., the recording date, recording time, week information, and channel information, necessary to perform recording reservation.

FIG. 7 shows the detailed contents of the REC management information table 2011. In this REC management information table 2011, the number of pieces of recording reservation information #1 to #n is described by, e.g., two bytes (2021). A recording reservation information search pointer can also be described in the REC management information table 2011. Additionally, the REC management information table 2011 can contain information for identifying whether the corresponding optical disk 100 is dedicated to recording a certain specific program or for general use.

FIG. 8 shows the detailed contents of one of the pieces of recording reservation information described above. This recording reservation information has areas for describing pieces of information (a) to (k) below.

Information (a) . . . the length of program name is described by one byte.

Information (b) . . . the program name is described.

Figure 9:
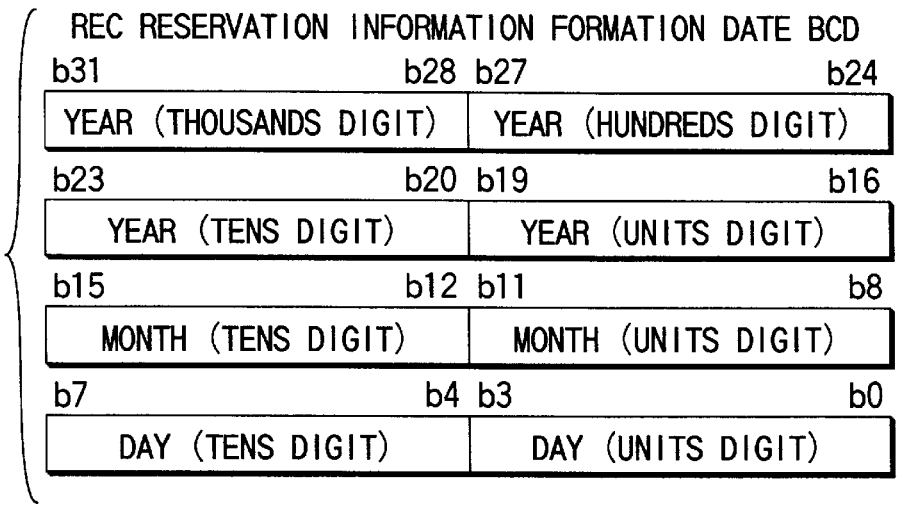
FIG. 9 is a view for explaining the detailed contents of recording reservation information formation date information in the recording reservation information.

Information (c) . . . the date in which this recording reservation information is formed is described by four bytes (the data format is shown in FIG. 9).

Figure 10:
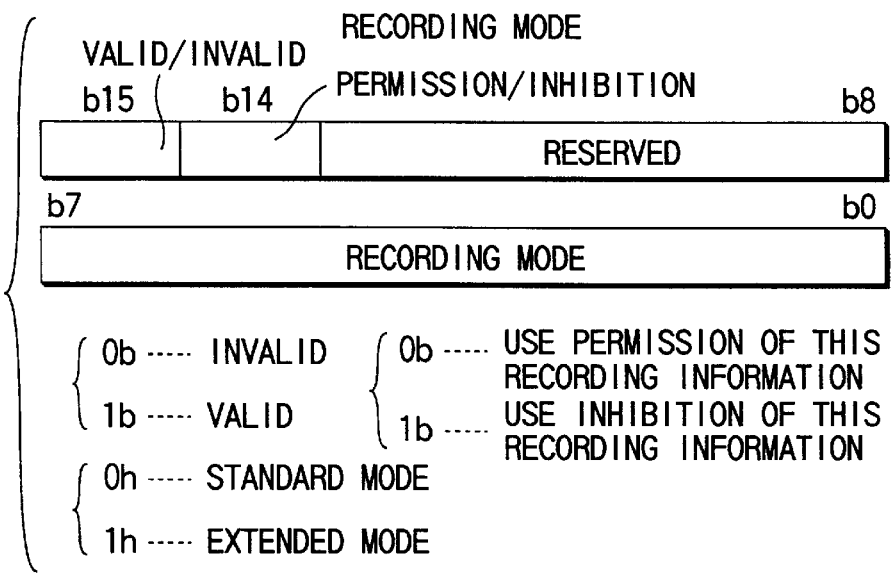
FIG. 10 is a view for explaining the detailed contents of recording mode information in the recording reservation information.

Information (d) . . . the valid/invalid flag, user inhibition/permission flag, and the recording mode such as standard/extended mode of this recording reservation information are designated (the data format is shown in FIG. 10).

Figure 11:
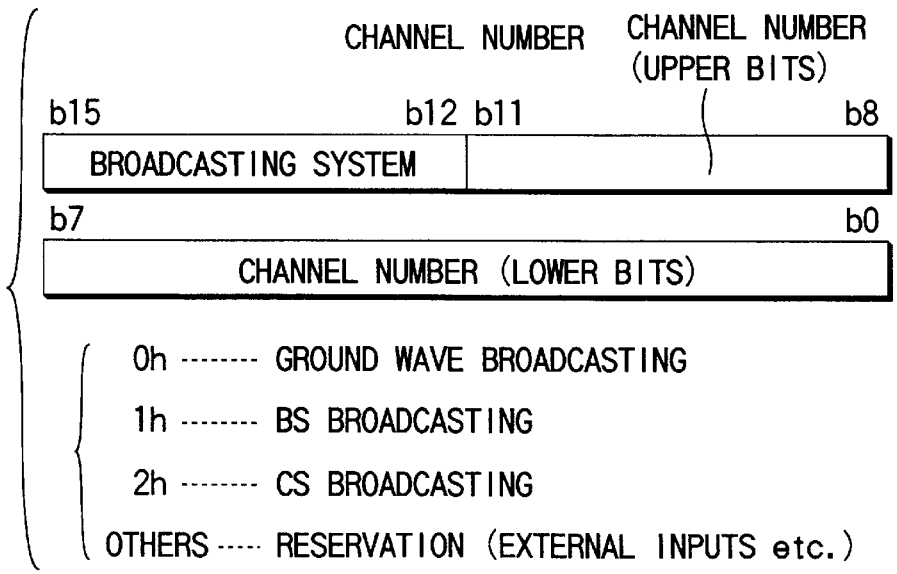
FIG. 11 is a view for explaining the detailed contents of channel number information in the recording reservation information.

Information (e) . . . the channel number subjected to recording is designated (the data format is shown in FIG. 11).

Information (f) . . . the recording day and valid recording weeks are described. For example, Monday is designated as the recording day, and five weeks are designated as the valid period (the data format is shown in FIG. 12).

Information (g) . . . the recording date is described by the dominical year (the data format is shown in FIG. 13). When this information (g) is described, the information has priority over the designation in the information (f).

Information (h) . . . the recording start time is described.

Information (i) . . . the recording end time is described.

Information (j) . . . the recording group number is described.

Information (k) . . . the recording program chain ID is recorded.

FIG. 9 shows the data format of the recording reservation information formation date as the information (c). The thousands and hundreds digits of the dominical year are written in the 31st to 24th bits. The tens and units digits of the dominical year are written in the 23rd to 16th bits. The tens and units digits of the month are written in the 15th to 8th bits. The tens and units digits of the day are written in the 7th to 0th bits.

FIG. 10 shows the data format of the recording mode as the information (d). Information indicating whether this recording reservation information is valid or invalid is described by 0b or 1b in the 15th bit. Information indicating whether a user is permitted to use or inhibited from using this recording reservation information is described by 0b or 1b in the 14th bit. The recording mode is described in the 7th to 0th bits. 0h and 1h are described when the recording mode is a standard mode and an extended mode, respectively.

FIG. 11 shows the channel number information as the information (e). Information for discriminating between broadcasting systems is described in the 15th to 12th bits. 0h means ground wave broadcasting, 1h means BS broadcasting, 2h means CS broadcasting, and others mean "reserved" (e.g., external input). The channel number is described in the 11th to 0th bits.

FIG. 12 shows the data format of information of the recording day as the information (f). The valid period of recording is described in the 15th to 12th bits. 1 to 14 weeks and indefinite period can be designated. The valid recording week is described in the 11th to 8th bits. That is, whether recording is to be performed in, e.g., the first or second week is described. If a flag is described in the 7th bit, every day is designated. Sunday, Monday, Tuesday, Wednesday, Thursday, Friday, and Saturday can be designated in the 6th to 0th bits.

FIG. 13 shows the data format of the recording date as the information (g). The recording day and time can be designated by writing the date by the dominical year. The thousands and hundreds digits of the dominical year are written in the 31st to 24th bits, and the tens and units digits of the dominical year are written in the 23rd to 16th bits. The tens and units digits of the month are written in the 15th to 8th bits, and the tens and units digits of the day are written in the 7th to 0th bits.

FIG. 14 shows the data format of the start and end times as the pieces of information (h) and (i). Each of hours and minutes is described by a number of two figures.

As shown in FIG. 8, the recording group number exists as the information (j) and the recording program chain ID exists as the information (k) in the recording reservation information.

The recording group number means the group number of a recording program designated by a user. By designating this group number, recorded programs having the same group number can be continuously reproduced by the same sequence even if the recording dates are different.

The recording program chain ID determines a program chain to which a program to be recorded by this recording reservation information belongs.

Figures 15A, 15B:
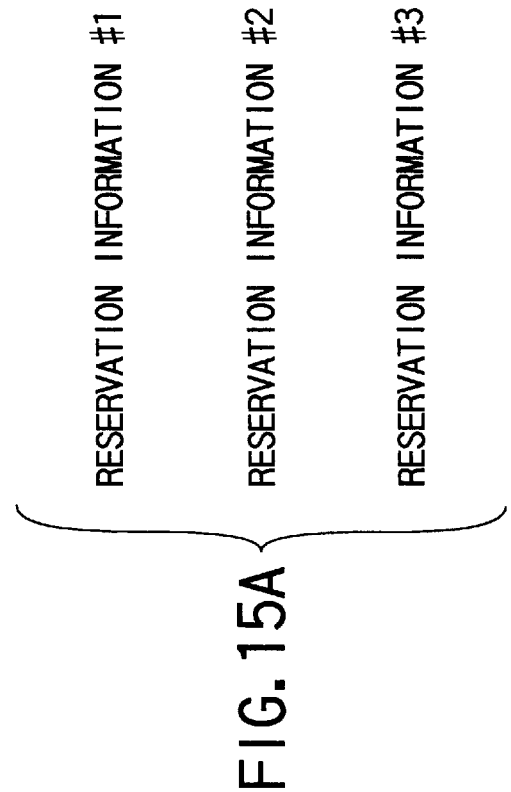
FIGS. 15A and 15B are views for explaining an example of the recording reservation information and an image of a recording array based on the information.

FIG. 15A shows examples of REC reservation information #1, #2, and #3 when all reserved programs are continuously recorded by a single sequence. Not all items but only some of them are shown as each REC reservation information.

FIG. 15B shows a recording array image of the contents recorded on the basis of the above recording reservation information. This can also be regarded as an image of the playback order. That is, the same group number and the same program chain ID are described in all pieces of REC reservation information. Accordingly, #1, for example, is constructed as a program chain corresponding to the program chain ID, and reserved programs are continuously recorded over weeks. 1W and 2W mean the first and second weeks, respectively.

FIG. 16A shows examples of REC reservation information #1, #2, and #3 when reserved programs are grouped in different sequences and recorded. Not all items but only some of them are shown as each REC reservation information.

FIGS. 16B to 16D show images of the playback orders of the contents recorded on the basis of the above pieces of REC reservation information. The recording array is the order of execution of recording operations, i.e., the image shown in FIG. 15B. That is, the REC reservation information #1 designates group number 1 and 00000001h as the program chain ID. Therefore, a program chain is set in the order as shown in FIG. 16B when programs are recorded, and these programs are reproduced in this order.

The REC reservation information #2 designates group number 2 and 00000002h as the program chain ID. Hence, a program chain is set in the order as shown in FIG. 16C when programs are recorded, and these programs are reproduced in this order. The REC reservation information #3 designates group number 3 and 00000003h as the program chain ID. So, a program chain is set in the order as shown in FIG. 16D when programs are recorded, and these programs are reproduced in this order.

When reservation recording is complete, this recording/playback apparatus sets the playback order of cells recorded on the basis of the reservation information as a program chain and records the program chain in a playback control information unit (FIGS. 2A to 2E, 3A, and 3B).

Referring back to FIG. 1, the recording/playback apparatus will be described. Data processing for recording is as follows.

To perform a read and write to a file management area, the main MPU 101 can perform a data read and write to the data processor 103 via a microcomputer bus. First, upon receiving a recording instruction, the main MPU 101 determines an area in which management data read from the disk drive 102 is to be written. Next, the main MPU 101 resets a management area so as to write the data in the determined area. The main MPU 101 then sets the write start address of video data in the disk drive 102 to prepare for data recording.

Subsequently, the main MPU 101 resets the time of the STC unit 109. The STC unit 109 is the system reference clock, and recording and playback are executed on the basis of this value. Additionally, the main MPU 101 sets various data to operate the apparatus.

A video signal flows as follows. First, an input AV signal from the tuner 108 or AV input unit 107 is converted into a digital signal. Video and audio signals are input to the video encoder 202 and the audio encoder 203, respectively. A closed caption signal or a text signal of, e.g., text broadcasting is applied to the SP encoder 204.

The encoders 202, 203, and 204 respectively compress the input signals and packet the signals by setting the PTS and DTS. After that, these packets are supplied to the formatter 205.

The formatter 205 temporarily holds the video, audio, and SP packet data in the buffer memory 206 and forms system streams (packs) from the input packet data. To add information necessary for playback, it is also possible to align the packs for each video GOP and add the NV pack to the head of the GOP. The packed data is input to the data processor 103.

The data processor 103 forms an ECC (error correction code) block in units of 16 packs, adds an ECC to the block, and sends the block to the disk drive 102. If, however, the disk drive 102 has not prepared to record the data in the optical disk 100, the data processor 103 transfers the data to the temporary storage 105, waits until the disk drive 102 prepares to record the data, and starts recording after that. The temporary storage 105 is preferably a large-capacity memory to hold a few minutes or more of recording data by rapid access.

At the end of recording, the address data of each NV pack is recorded in the fast forward playback and fast rewind playback data areas in the NV pack, and information necessary after recording is recorded in the management areas, thereby completing the recording operation.

Data processing for playback is as follows. First, when receiving a playback instruction, the main MPU 101 reads data in the management area from the disk drive 102 via the data processor 103 and determines addresses to be reproduced. Next, the main MPU 101 sends the determined addresses of data to be reproduced and a read instruction to the disk drive 102.

On the basis of the input instruction, the disk drive 102 reads out the data from the optical disk 100. The data processor 13 performs error correction, packs the data, and outputs the packed data to the decoding unit 106.

In the decoding unit 106, the separator 301 receives and packets the readout packed data and transfers video packet data (MPEG video data), audio packet data, and SP packet data to the video decoder 302, the audio decoder 304, and the SP decoder 303, respectively. Also, the separator 301 stores the NV pack in the internal memory 301a so that the main MPU 101 can access any time.

At the start of packet data transfer, the DTS or PTS is loaded into the STC unit 109. That is, the main MPU 101 sets the internal PTS of the NV pack in the STC unit 109, or the video decoder 302 automatically sets the DTS or PTS of video data in the STC unit 109. After that, the decoders 302, 303, and 304 reproduce the packet data in synchronism with the PTS value in the packet data (by comparing the PTS value with the STC value) and thereby can reproduce motion video with sound and a caption on a TV screen.

Next, reservation recording as the characteristic feature of the present invention will be described below. In a recording medium (a DVD disk in the case of a recording/playback DVD apparatus), information pertaining to reservation unique to the disk can be recorded. The pieces of information pertaining to recording reservation have been previously described.

Figure 17A:
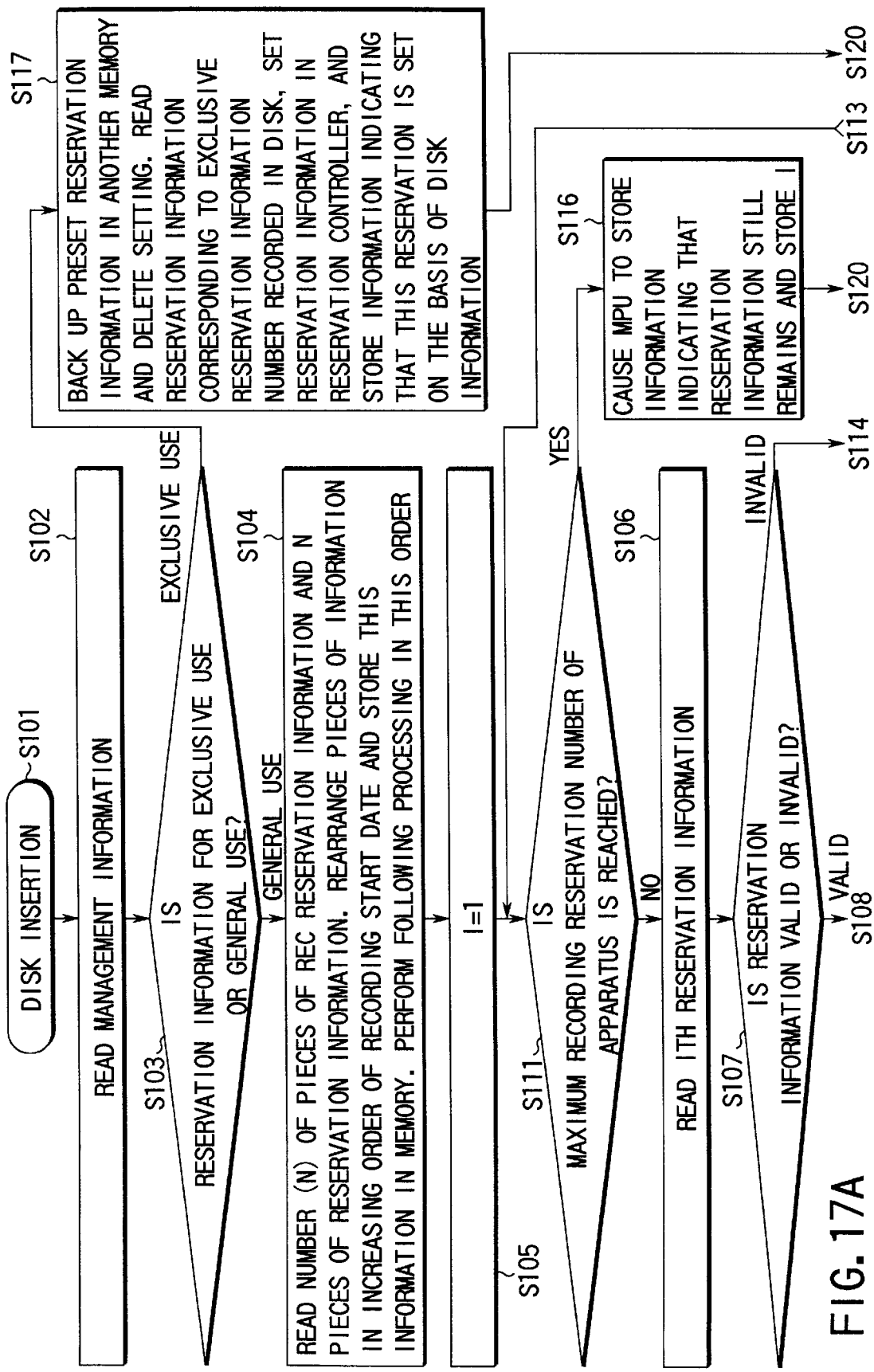
FIGS. 17A and 17B are flow charts for explaining a reservation recording setting operation of the recording/playback apparatus when a disk is inserted.
Figure 17B:
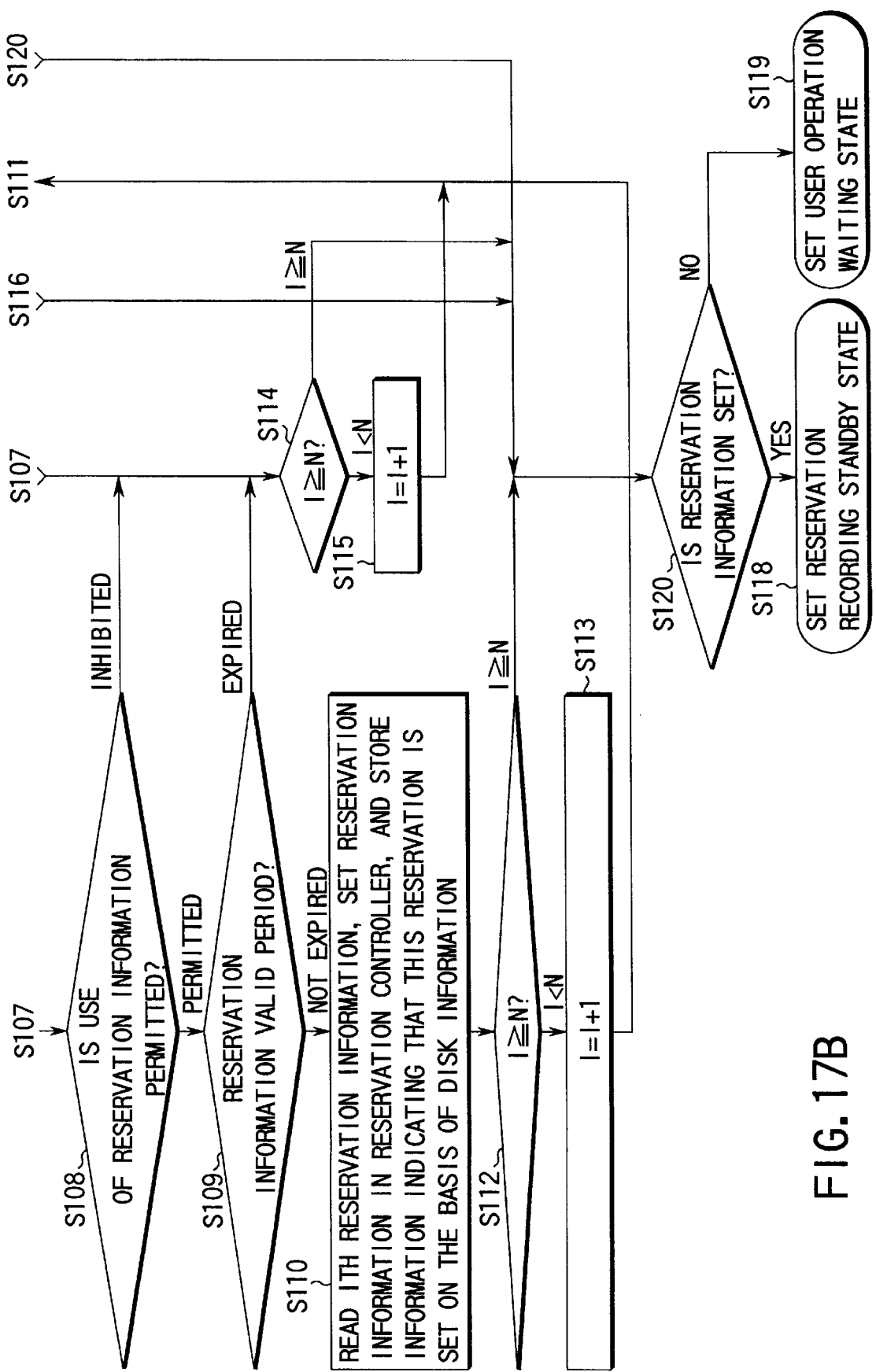

An operation of setting the optical disk 100 in which recording reservation information is already recorded into the recording/playback apparatus of the present invention will be described below with reference to flow charts shown in FIGS. 17A and 17B.

First, the optical disk 100 is inserted (S101). The main CPU 101 reads the management information necessary for recording and playback from the optical disk 100 (S102). The main MPU 101 reads and checks the information for discriminating between exclusive use and general use of the recording reservation information (S103). If no exclusive use/general use information is written, this determination process is omitted.

If the information is for exclusive use, the flow advances to step S117, the main MPU 101 reads recording reservation information corresponding to the exclusive recording reservation information number recorded together with the exclusive information and sets the read information in the internal reservation recording controller. The main MPU 101 also stores information indicating that this reservation information is based on the information recorded in the optical disk 100 (S117). After that, the main MPU 101 sets a recording standby state (S118).

If the information is for general use, the main MPU 101 reads a total number N of pieces of recording reservation information (S104). If N=0, the main MPU 101 determines that there is no recording reservation information and sets a user operation waiting state (S119). If N≠0, the main MPU 101 reads N pieces of reservation information, rearranges these pieces of reservation information in increasing order of recording start date•time, and records the rearranged pieces of information in storage means such as a memory. After that, the main MPU 101 performs the following processing on the basis of these pieces of reservation information rearranged in increasing order of recording start date•time.

First, the main MPU 101 substitutes 1 in a variable I (S105) and checks whether the maximum recording reservation number of the apparatus is reached (S111). If the maximum number is reached, the flow advances to step S116, and the main MPU 101 stores information indicating that the pieces of reservation information recorded in the optical disk 100 still remain, and also stores the Ith reservation information in the order in which the recording start dates are rearranged in increasing order of time. After that, the flow advances to processing in step S120. If the maximum number is not reached, the main MPU 101 reads the Ith reservation information (S106).

Next, the main MPU 101 checks information pertaining to reservation information validity (S107). If the information is invalid, the flow advances to step S114, and the main MPU 101 checks whether I≧N (S114). If I≧N, the flow advances to step S120. If I<N, the main MPU 101 adds 1 to I (S115), and the flow again advances to step S111. If the reservation information is valid, the flow advances to step S108, and the main MPU 101 checks information pertaining to reservation information use permission (S108).

If the use of the reservation information is inhibited, the flow advances to step S114, and the main MPU 101 checks whether I≧N (S114). If I≧N, the flow advances to step S120. If I<N, the main MPU 101 adds 1 to I (S115), and the flow again advances to step S111.

If the use of the reservation information is permitted, the flow advances to step S109, and the main MPU 101 checks the valid period of the reservation information by collating the valid period with the date•time of the internal timer (S109).

If the valid period has expired, the flow advances to step S114, and the main MPU 101 checks whether I≧N (S114). If I≧N, the flow advances to step S120. If I<N, the main MPU 101 adds 1 to I (S115), and the flow again advances to step S111.

If the valid period has not expired, the flow advances to step S110, and the main MPU 101 sets the Ith reservation information in the reservation controller. Simultaneously, the main MPU 101 stores information indicating that this reservation is based on the information recorded in the optical disk 100 (S110).

Next, the main MPU 101 checks whether I≧N (S112). If I≧N, the flow advances to step S120. If I<N, the main MPU 101 adds 1 to I (S113), and the flow again advances to step S111.

Finally, the main MPU 101 checks whether recording reservation information is set (S120). If recording reservation information is set, the main MPU 101 sets a recording standby state (S118). If no recording reservation information is set, the main MPU 101 sets a user operation waiting state (S119).

Figure 18A:
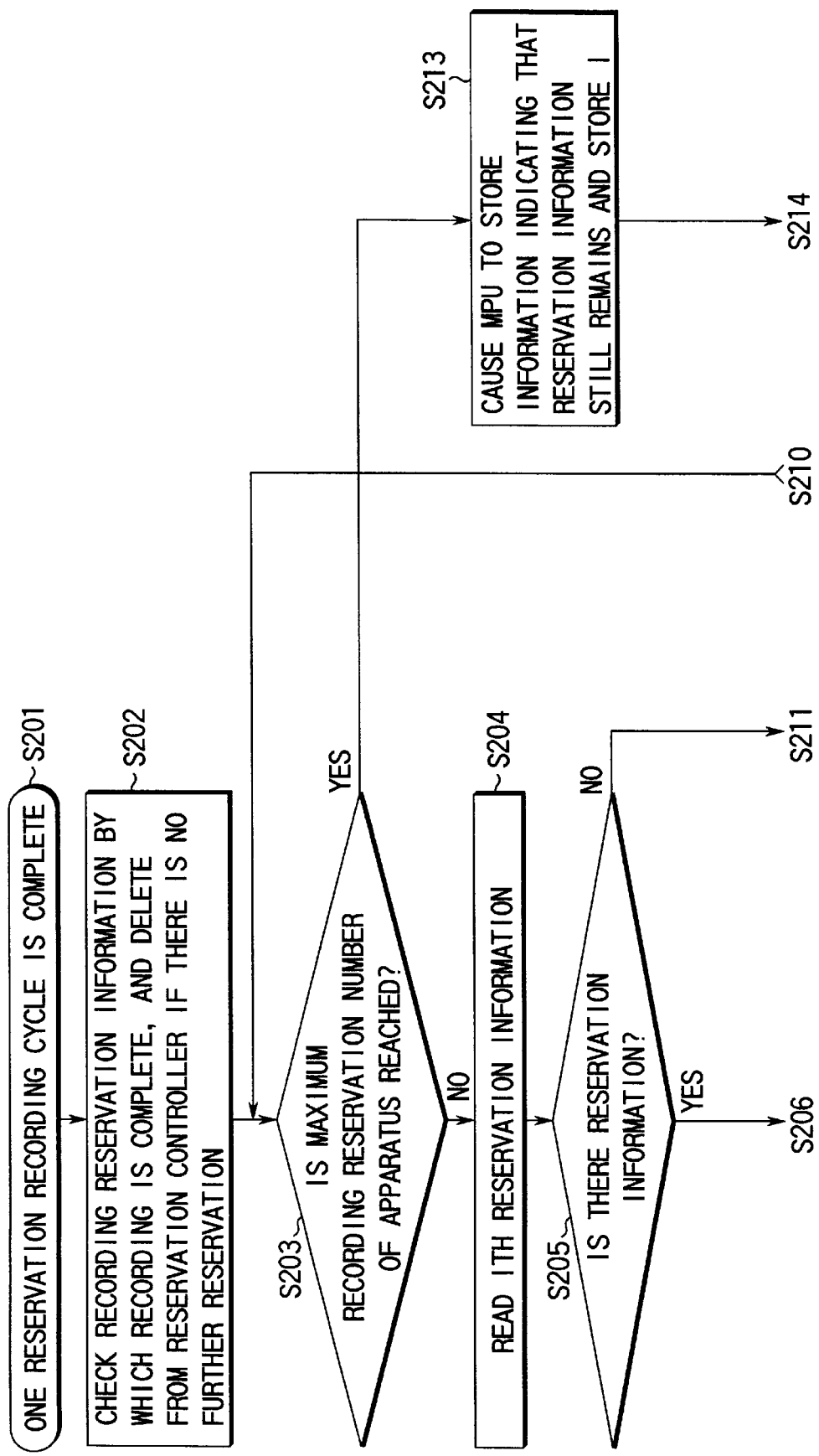
FIGS. 18A and 18B are flow charts for explaining an operation performed at the end of reservation recording by the recording/playback apparatus.
Figure 18B:
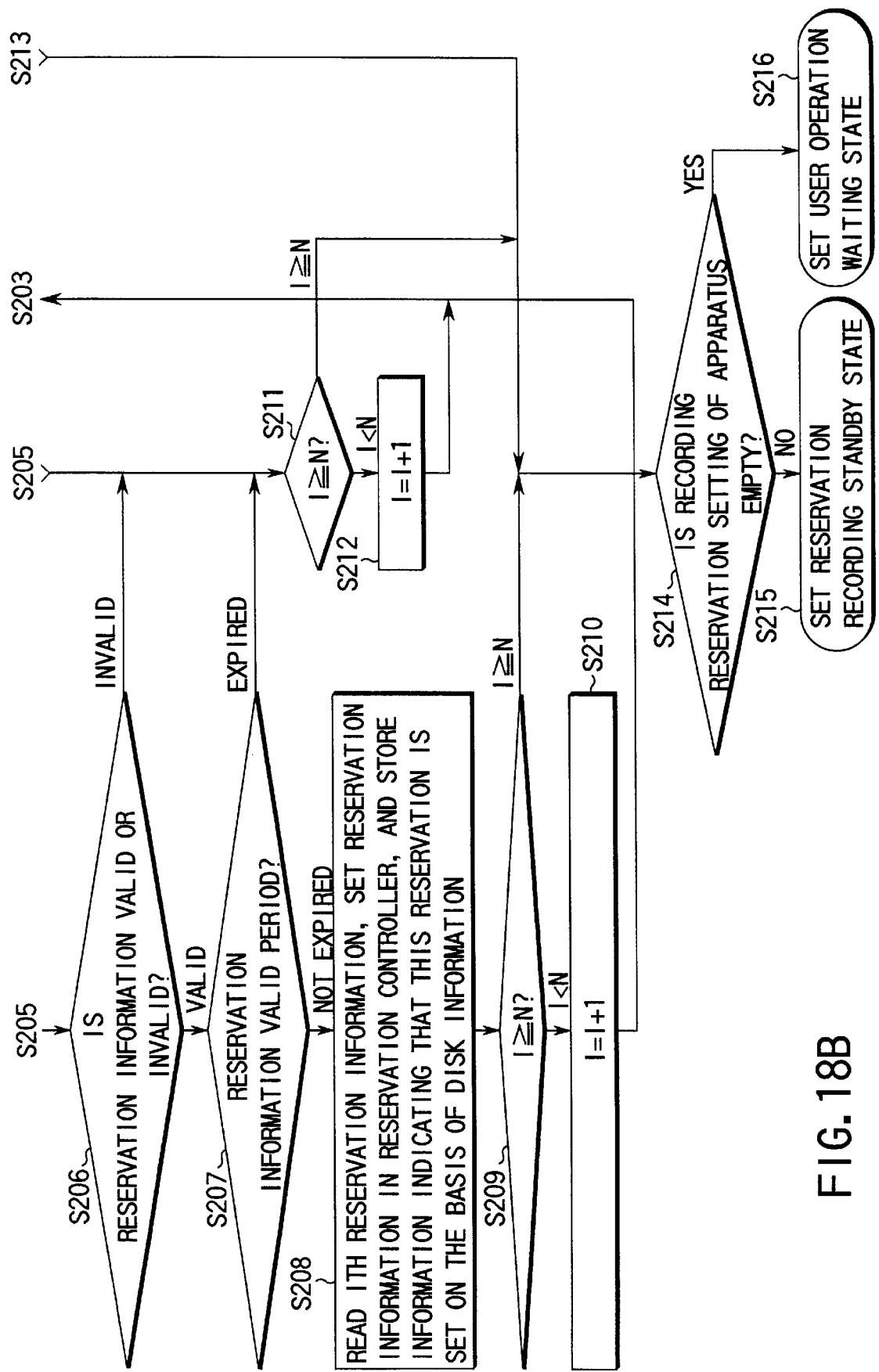

An operation of this apparatus when one reservation recording cycle is complete will be described below with reference to flow charts shown in FIGS. 18A and 18B. This operation is performed to make next reservation when a reservation setting frame is empty.

In the recording standby state, the main MPU 101 starts the processing each time one reservation recording cycle is complete (S210). The main MPU 101 checks reservation information by which recording is completely performed and deletes this information from the reservation recording controller if it is clearly known that there is no further reservation recording because, e.g., the information does not indicate any weekly repetitive recording or the valid period has expired (S202). The main MPU 101 then checks whether the maximum recording reservation number of the apparatus is reached (S203).

If the maximum number is reached, the flow advances to step S213, and the main MPU 101 stores information indicating that the pieces of reservation information recorded in the optical disk 100 still remain, and also stores the Ith reservation information in the order in which the recording start dates are rearranged in increasing order of time. After that, the flow advances to processing in step S214.

If the maximum number is not reached, the main MPU 101 reads the Ith reservation information from the optical disk 100 (S204). After that, the main MPU 101 checks whether there is reservation information (S205). If there is no reservation information, the flow advances to step S211, and the main MPU 101 checks whether I≧N (S211). If I≧N, the flow advances to step S214. If I<N, the main MPU 101 adds 1 to I (S212), the flow again advances to step S203.

If reservation information exists in step S205, the main MPU 101 checks information pertaining to the validity of the reservation information (S206). If the information is invalid, the flow advances to step S211, and the main MPU 101 checks whether I≧N (S211). If I≧N, the flow advances to step S214. If I<N, the main MPU 101 adds 1 to I (S212), and the flow again advances to step S203.

If the reservation information is valid, the flow advances to step S207, and the main MPU 101 checks the valid period of the reservation information by collating the valid period with the date•time of the internal timer (S207). If the valid period has expired, the flow advances to step S211, and the main MPU 101 checks whether I≧N (S211). If I≧N, the flow advances to step S214. If I<N, the main MPU 101 adds 1 to I (S212), and the flow again advances to step S203.

If the valid period has not expired, the flow advances to step S208, and the main MPU 101 sets the Ith reservation information in the reservation controller. Simultaneously, the main MPU 101 stores information indicating that this reservation is based on the information recorded in the optical disk 100 (S208). After that, the main MPU 101 checks whether I≧N (S209). If I≧N, the flow advances to step S214. If I<N, the main MPU 101 adds 1 to I (S210), and the flow again advances to step S203.

Finally, the main MPU 101 checks whether recording reservation information is set (S214). If recording reservation information is set, the main MPU 101 sets a recording standby state (S215). If no recording reservation information is set, the main MPU 101 sets a user operation waiting state (S216).

A control operation performed when the optical disk 100 is removed will be described below with reference to a flow chart shown in FIG. 19. In response to a request for removal of the optical disk 100, the recording/playback apparatus starts a process of discharging the optical disk 100 (S301). First, on the basis of information indicating "this is reservation information recorded in a disk" which is held together with reservation information stored in the reservation recording controller, the corresponding reservation information is deleted from the reservation recording controller.

If the recording medium is the optical disk 100 for exclusive use, "reservation state before disk insertion" backed up before the disk is inserted is restored (S302). That is, recording reservation information preset in the apparatus is restored. After that, the optical disk 100 is ejected(S303).

Next, an operation of checking the remaining recording capacity of the optical disk 100 when recording reservation is set after the optical disk 100 is inserted will be described below with reference to FIG. 20.

When the optical disk 100 is inserted (S401), a process of setting recording reservation information is performed (S402). A remaining amount (A) of the optical disk 100 is then checked (S403). A necessary capacity (B) is calculated from the total recording time and the recording modes (recording speeds) of set recording reservation (S404). This calculation is executed by (recording time)×(recording mode)=necessary capacity B Next, the remaining capacity A of the optical disk 100 and the necessary amount B of recording are compared (S405). If the remaining capacity is larger, a recording standby state is set (S406). If the necessary capacity is larger, a user is informed by display or sound that the remaining capacity is insufficient, or the optical disk 100 is ejected after confirming this information (S407). After that, a user operation waiting state is set (S408).

Note that FIG. 20 shows the recording reservation information setting process (S402) after the optical disk 100 is inserted. However, the remaining amount can also be checked whenever a recording reservation operation is complete.

Figure 21A:
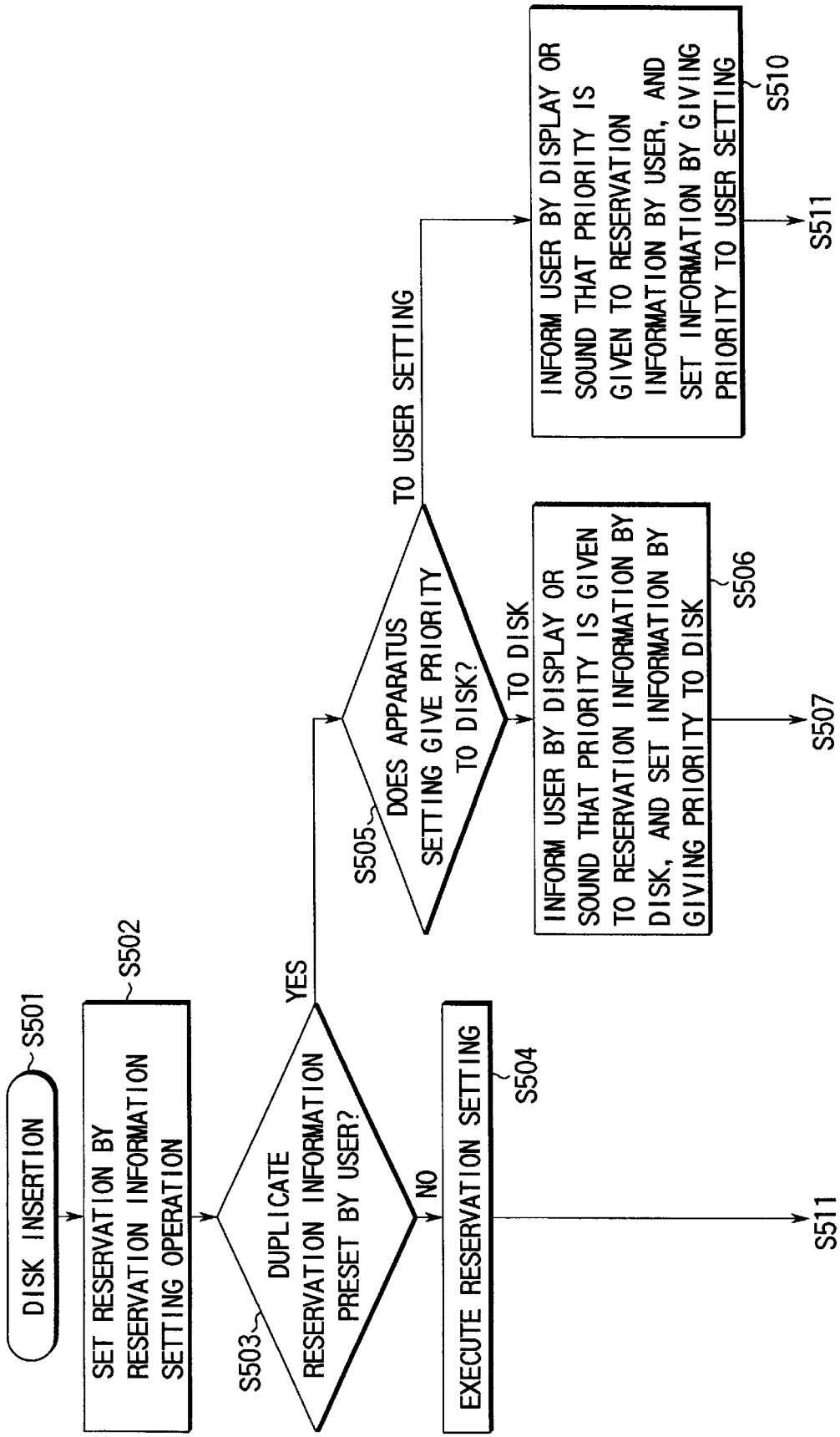
FIGS. 21A and 21B are flow charts for explaining an operation of the recording/playback apparatus when one disk reservation recording information duplicates another.
Figure 21B:
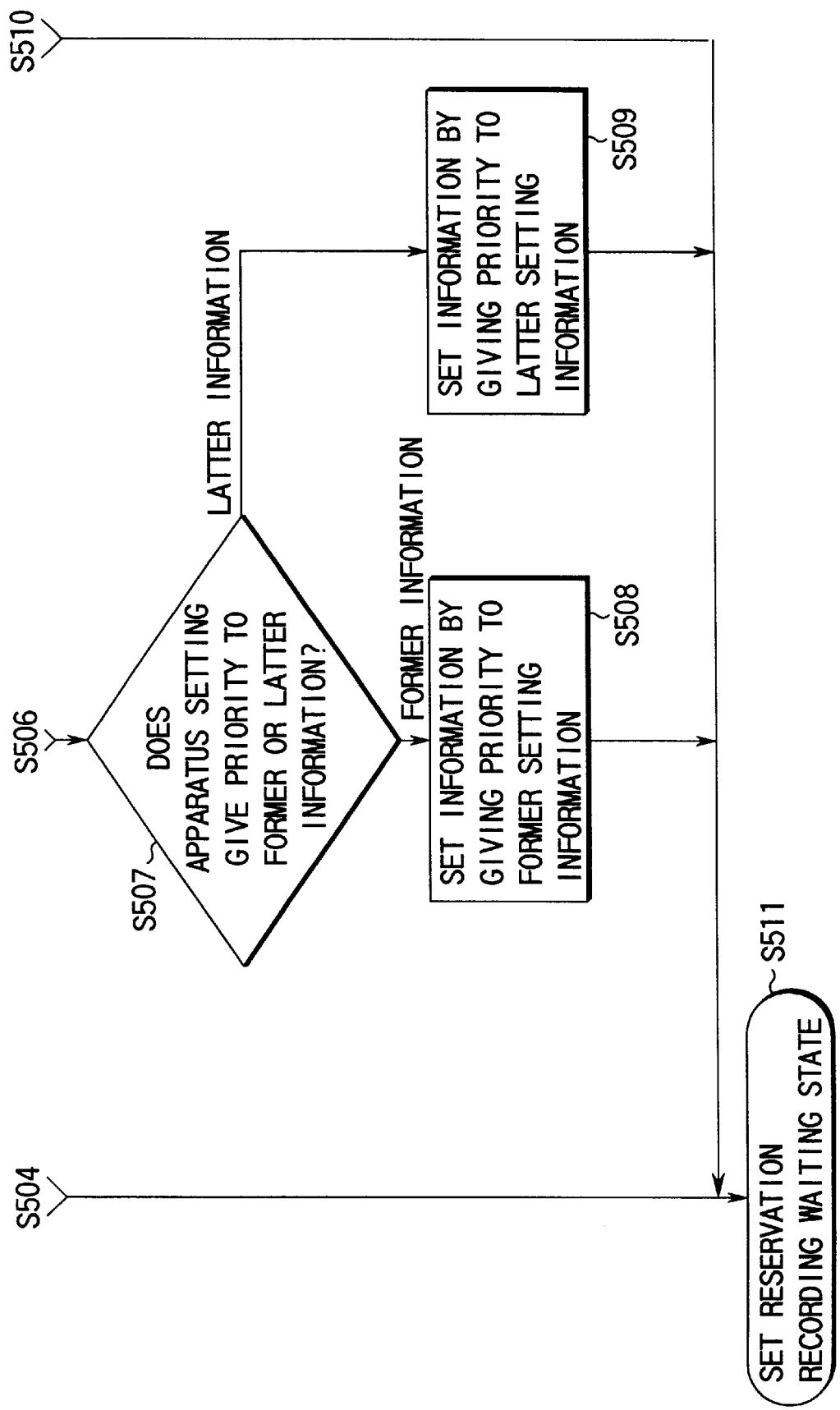

An operation when one recording reservation information duplicates another will be described below with reference to FIGS. 21A and 21B. First, a user inserts the optical disk 100 (S501) and sets reservation information (S502). Whether this reservation information duplicates preset reservation information is checked (S503). If NO in step S503, this reservation information is set (S504), and a reservation recording standby state is set (S511).

If YES in step S503, whether the setting of the apparatus gives priority to disk information or user setting is checked (S505). If the user setting is given priority, the user is so informed by display or sound, and reservation is set on the basis of the user information (S510). After that, a recording standby state is set (S511). If the disk information is given priority, the user is so informed by display or sound, and reservation is set on the basis of the disk information (S506).

Furthermore, whether the setting of the apparatus gives priority to former setting or latter setting is checked (S507). If former setting is given priority, reservation is set by giving priority to the former information (S508). If latter setting is given priority, reservation is set by giving priority to the latter information (S509). After that, a recording standby state is set (S511).

Figure 22:
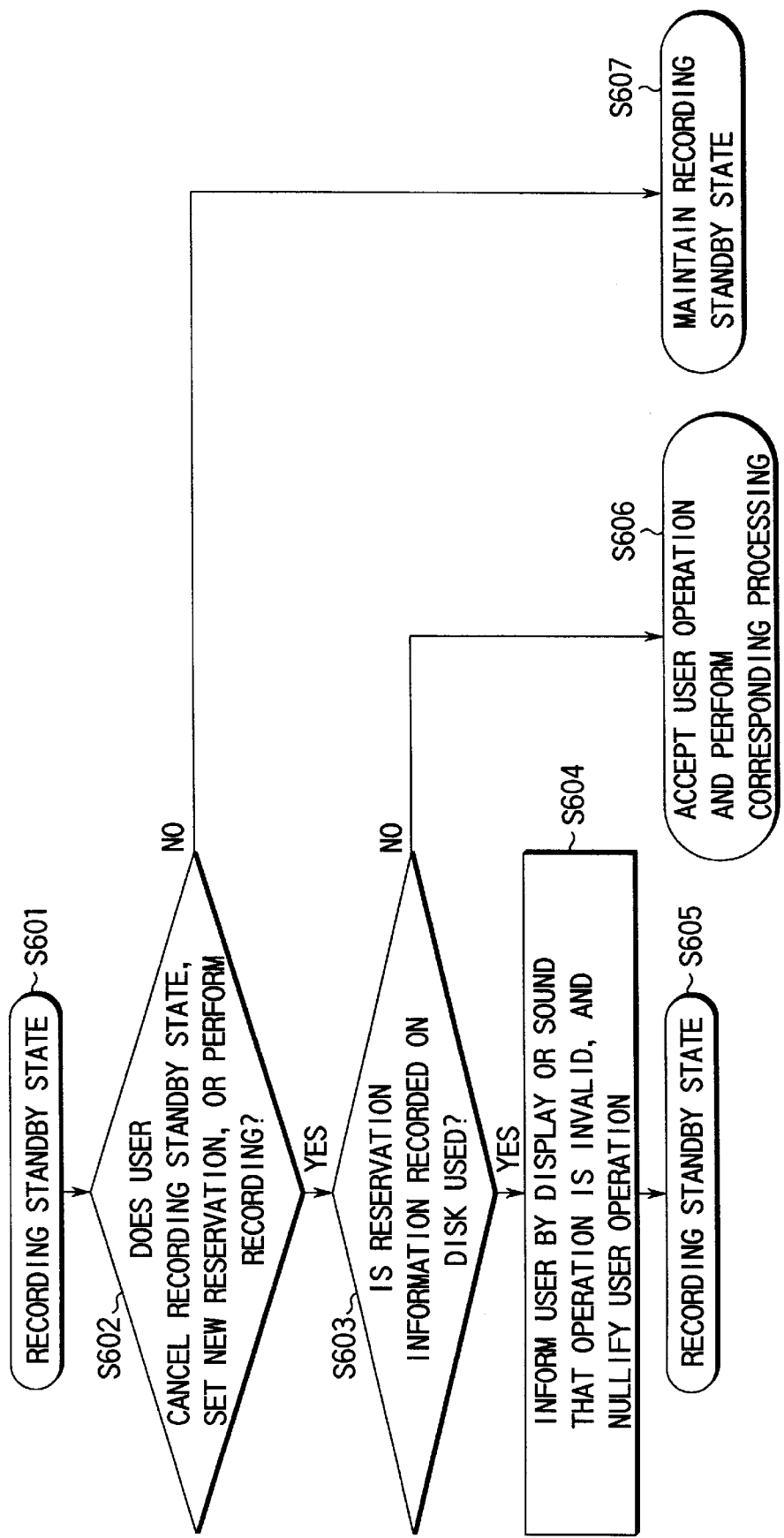
FIG. 22 is a flow chart for explaining an operation of the recording/playback apparatus when a user operates the apparatus in a reservation recording standby state.

A user operation in a recording standby state will be described below with reference to a flow chart shown in FIG. 22. In a reserved program recording standby state (S601), whether a user cancels the recording standby state, sets new recording reservation, or performs recording by the user's own intention is checked (S602). If no such operation is performed, the recording standby state is maintained (S607).

If any of the above operations is performed, whether the current standby state is set because reservation setting is performed by using reservation information recorded on the optical disk 100 is checked (S603). If reservation information recorded on the optical disk 100 is not used, the user operation is accepted, and the corresponding processing is performed (S606).

If the standby state is set by using reservation information recorded in the optical disk 100, the user is informed by display or sound that the operation is invalid, and the user operation is nullified (S604). After that, a reservation standby state is set (S605).

Figure 23:
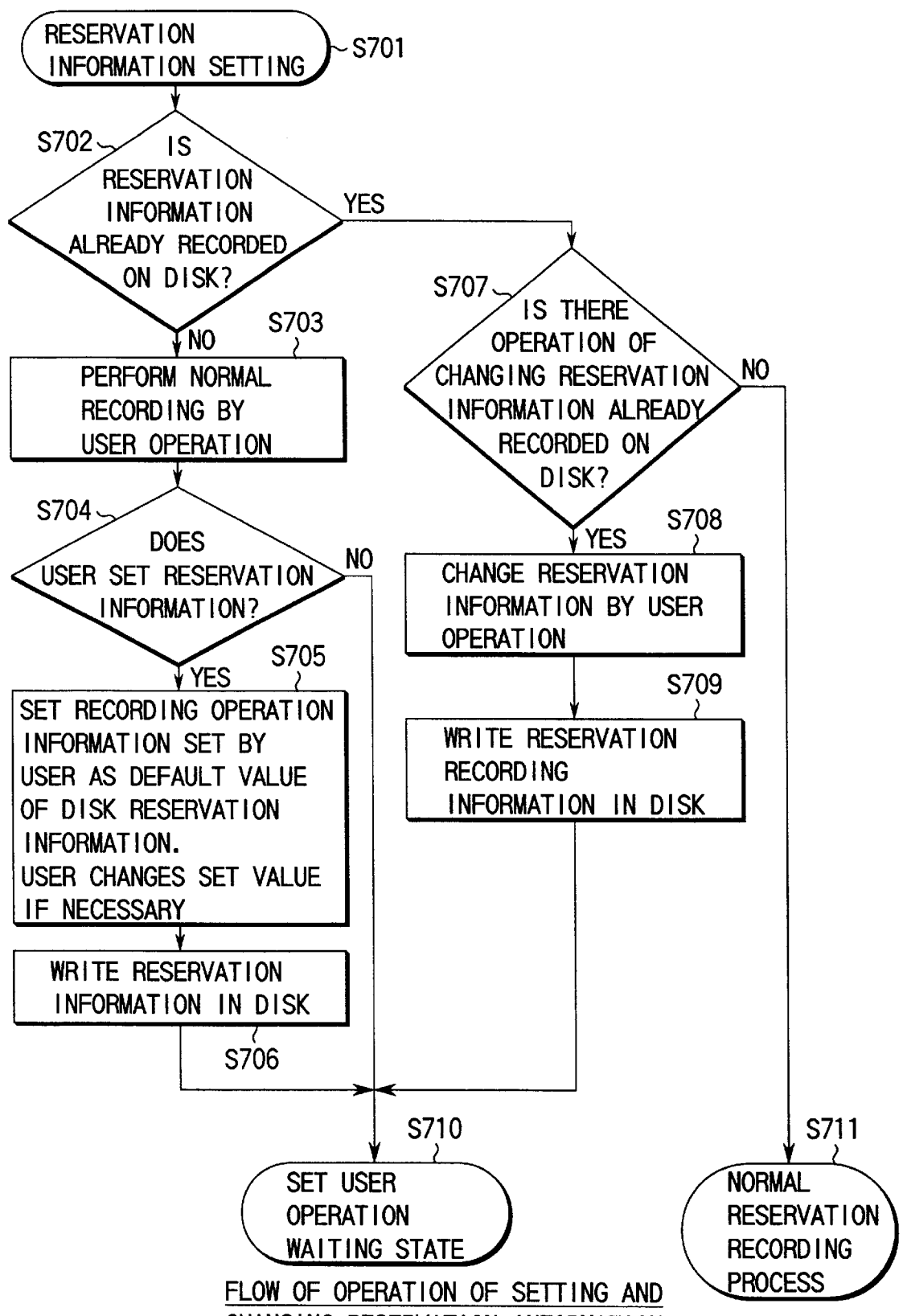
FIG. 23 is a flow chart for explaining an operation of the recording/playback apparatus when reservation recording information is set or changed.

A reservation information setting•changing operation will be described below with reference to a flow chart shown in FIG. 23. To set reservation information, a user inserts the optical disk 100 to start setting reservation information (S701). Whether reservation information is already recorded on the optical disk 100 is checked (S702). If no information is recorded, the immediately preceding recording operation information set by the intention (operation) of the user is kept stored (S703). The items of the stored recording operation information correspond to the items of reservation information.

Next, whether the user executes disk reservation information setting is checked (S704). If YES in step S704, the recording operation information stored by the last operation is set as a default value of disk reservation information and, where necessary, the user changes the set contents (S705). This allows the user to set reservation information relatively easily without inputting a large number of items.

Subsequently, on the basis of the user's final confirmation, the recording reservation information is written in the optical disk (S706), and a user operation waiting state is set (S710). If NO in step S704, the user operation waiting state is immediately set (S710).

If reservation information is already recorded, whether the user wants to change this already recorded reservation information is checked (S707). If YES in step S707, the user properly changes the contents (S708), the reservation information is written in the optical disk 100 on the basis of the user's final confirmation (S709), and the user operation waiting state is set (S710). If NO in step S707, the normal reservation recording process described above is performed (S711).

The form of recording reservation information is not limited to that of the above embodiment. That is, other various forms are possible, and the number of reservation items can be increased or decreased. Also, the reservation information recording position in the optical disk 100 can be changed.

Figure 24:
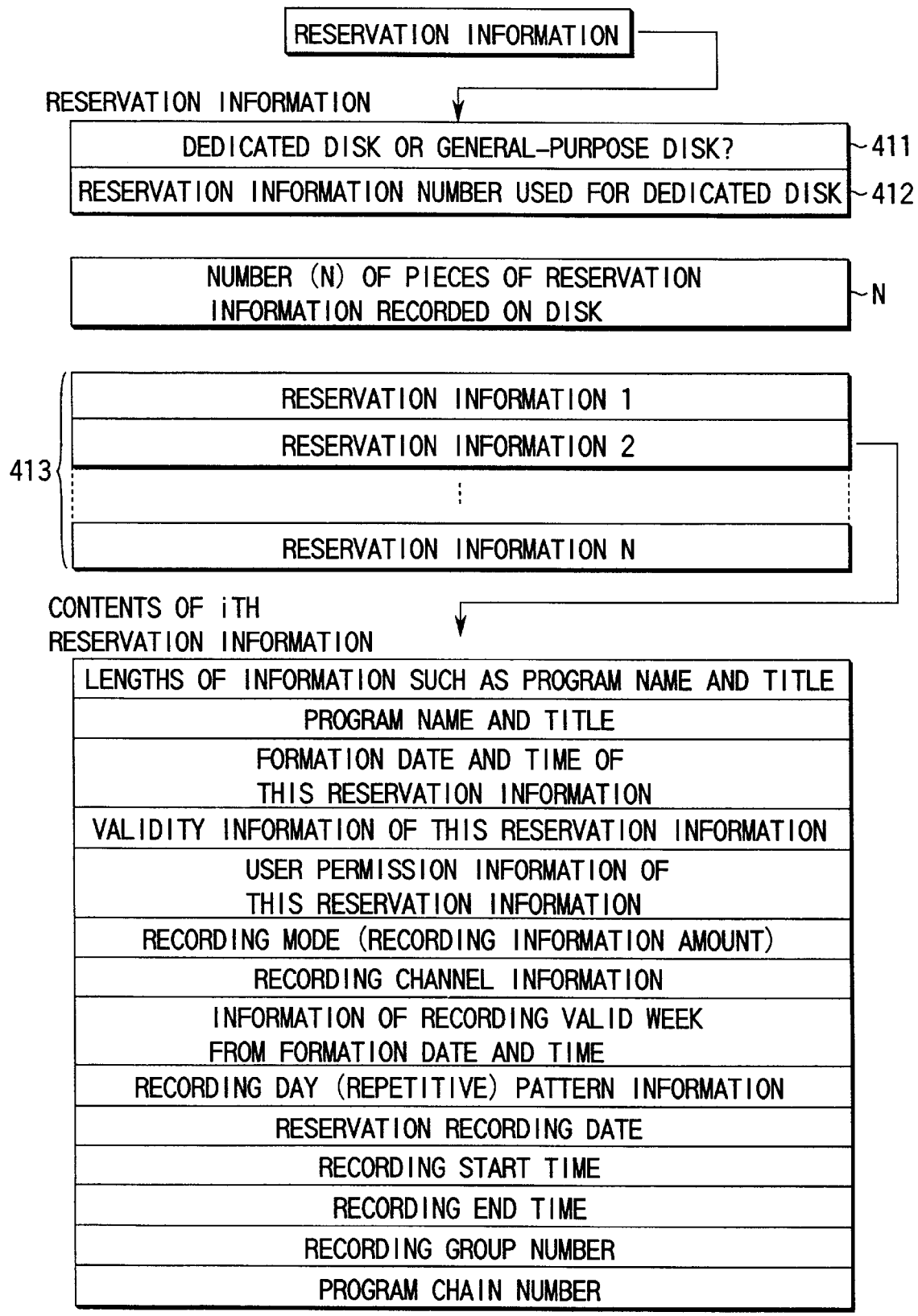
FIG. 24 is a view for explaining another example of the recording control information in the optical disk data structure.

FIG. 24 shows another embodiment. Reservation information of this embodiment is composed of: information 411 indicating whether this recording medium is dedicated to specific reservation recording; reservation information number 412 if the recording medium is for the exclusive use; a number N of pieces of reservation information recorded in an optical disk 100; and N pieces of reservation information 413.

The contents of the reservation information are as follows.

Length of program name and title information
Program name and title
Formation date and time of this reservation information
Validity information of this reservation information
User permission information of this reservation information
Recording mode (recording information amount)
Recording channel information
Recording valid week information from formation date and time
Recording day (repetitive) pattern information
Reservation recording date
Recording start time
Recording end time
Recording group number
Program chain number "Length of program name and title information" indicates the length of the subsequent items. "Program name and title" indicates the name and title of a program to be recorded by reservation. "Formation date and time of this reservation information" indicates the date and time when this reservation information is registered, which is the start point of the valid period of this reservation information. "Validity information of this reservation information" indicates whether the reservation information is valid or invalid. "Use permission information of this reservation information" indicates whether the use of this reservation information is permitted. For example, if a program which is recorded every Sunday is canceled only for the next week, a user can temporarily inhibit the use of this reservation information. Consequently, recording can be canceled only for the next week while the reservation information is kept stored.

"Recording mode (recording information amount)" corresponds to the tape speed of a VTR. For example, a recording disk use capacity can be selected from high quality, standard mode, and extended mode. "Recording channel information" designates the type of broadcasting, such as BS, CS, ground wave, or satellite digital broadcasting, and the channel number.

"Information of recording valid week from formation date and time" clearly shows the valid period of this reservation information and designates the number of weeks during which the reservation information is valid from the formation date and time. For example, recent continuous dramas are broadcast in units of three months. If this is the case, therefore, unnecessary recording after the completion of broadcasting can be prevented by setting "12 weeks" as the valid period.

The repetitive pattern of reservation information is set in "recording day (repetitive) pattern information". The pattern information includes a valid recording week indicating from which week since the insertion date of the optical disk 100 the reservation information becomes valid, and recording flags from Sunday to Saturday. A weekly designated day repetitive pattern can be freely set by combining these data. To record a certain program every day, it is possible to set the recording flags from Sunday to Saturday to "record" or separately prepare a flag indicating "record every day".

"Reservation recording date" is used to record one program or one episode of a continuous program and designates the date of recording. When this item is designated, the recording day pattern is nullified, and this recording date is given priority. It is possible to prepare a flag indicating the validity of this item or nullify the item if a nonexistent date, e.g., year "3", month "33", and day "33" is designated.

"Recording start time" is the time at which this reservation recording is started. "Recording end time" is the time at which this reservation recording is complete. "Recording group number" is a group number set by a user. Programs having the same group number are successively recorded (although these programs are not physically successively recorded in a recording medium, information indicating these programs are continuous is added to the programs).

For example, if reservation recording is set for a continuous drama A on Mondays and a documentary B on Wednesdays, different group numbers are designated for these programs A and B. Consequently, these two programs are separately managed by different program chains A1→A2→A3→A4→A5 and B1→B2→B3→B4. Accordingly, a user can continuously enjoy only the drama A later on by selecting the group number of the drama A. If the same group number is designated for both A and B, the same management as recorded in a VTR tape can be performed like A1→B1→A2→B2→A3.

"Program chain number" is an internal serial number by which this apparatus groups are formed by the recording group numbers. If a program C is already recorded before the programs A and B are recorded in the above example, three sequences exist in terms of disk management although the number of groups is 2. Accordingly, the recording group numbers and program chain numbers have a one-to-one correspondence with each other.

Reservation information is set in the optical disk 100 as follows. That is, the optical disk 100 is set in the apparatus, a user appropriately sets the information, and a means for recording reservation information finally records the information on the optical disk 100. This recording means can be either a part of the apparatus or separate means capable of reading and writing data with respect to the recording medium. An example is a personal computer including a recording medium read/write device.

Also, reservation recording information recorded on the optical disk 100 can be copied. That is, when an original optical disk is inserted and a copy operation is executed, reservation recording information recorded on the original disk is once backed up in storage means such as a memory. The original disk is then replaced with a copy disk, and the backed-up information is written in the copy disk. When the security of reservation recording information is taken into consideration, it is possible to reconfirm permission of recording when information is to be recorded on the optical disk 100.

Figure 25:
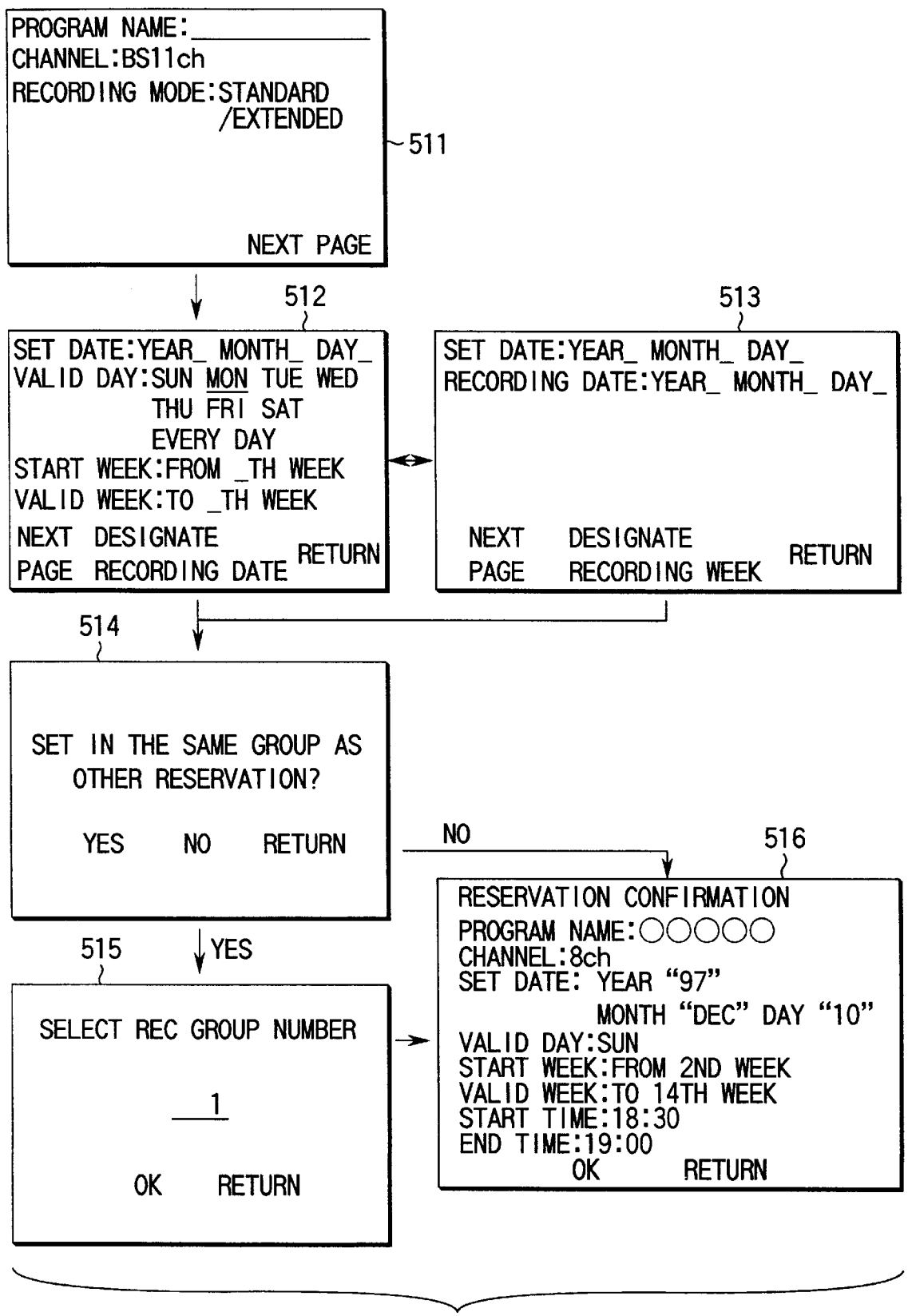
FIG. 25 is a view for explaining the display contents on the operation screen of the recording/ playback apparatus when a user inputs reservation information.

FIG. 25 shows a process in which a user inputs reservation information while monitoring the screen of a display device or a built-in display device of the apparatus. First, when the user sets a reservation mode, a screen display 511 for requesting channel input appears. The user sets a broadcasting system, channel, and recording mode and chooses "next page" by clicking or keying. Consequently, a screen display 512 for inputting a valid day, start week, and valid week appears.

A set day is automatically input by reading out timer information when data input in this screen display is complete. To designate the date and time, the user chooses "designate recording date and time" in the screen display 512 by clicking or keying. Consequently, a screen display 513 on the right side appears to allow the user to input the recording date. A screen display 514 appears when the user chooses "next page" in the screen display 512 or 513 by clicking or keying after inputting necessary information.

On the screen 514, the user is inquired of whether he or she wants to set a group number. If the user chooses "yes" by clicking or keying, a screen display 515 appears to allow the user to input a group number. When the user chooses "ok" on the screen 515 by clicking or keying, a screen display 516 appears to show a list of the contents of the individual reservation items, so the user can check the contents he or she inputs. This screen display 516 also appears when the user chooses "no" in the screen display 514 by clicking or keying.

To correct the contents of an item, it is only necessary to choose "return" by clicking or keying to sequentially return the previous screen display and correct the necessary item.

If the user wants to check other pieces of reservation information, he or she sets a separately prepared reservation status check mode. Consequently, reservation information recorded on the optical disk 100 is displayed as shown in a screen display 516, and the user can check the contents of the information. Pieces of reservation information can also be displayed in the form of windows on the screen of a display device. Additionally, the user can check the contents of the items of reservation information in the screen display 516 by designating the number of the reservation information.

If this is the case, reservation information reproduced from the optical disk 100 and reservation information recorded in the reproduction apparatus itself can be displayed in different colors in the screen display 516 so that the user can discriminate between them. Furthermore, the marks of the optical disk 100 and the reproduction apparatus can also be displayed for the discrimination purpose.

As described above, when reservation information is previously recorded on the disk (recording medium) according to the present invention, reservation recording can be performed only by loading the disk into a playback apparatus without performing any reservation setting.

Also, reservation recording of a program can be performed without performing any recording reservation setting. Additionally, to successively record one certain program in one specific disk, a user can easily manage the disk and need not perform recording reservation setting each time the program is recorded. This allows simple and efficient reservation recording.

Furthermore, the reproduction apparatus according to the present invention can read reservation information recorded on the disk and automatically set a recording reservation state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/playback apparatus for recording and reproducing information with respect to a recording medium, comprising:

control means for reading out information pertaining to recording reservation, which is recorded on said recording medium, and for executing reservation recording on the basis of the readout information, said control means including:

a) checking means for checking a remaining recording capacity of said recording medium;

b) comparing means for comparing the remaining recording capacity of said recording medium checked by said checking means with a recording information amount corresponding to a recording time designated by the information pertaining to recording reservation; and c) indicating means for indicating that the recording information amount is larger than the remaining recording capacity if the recording information amount is found to be larger than the remaining recording capacity as a result of the comparison by said comparing means.

2. An apparatus according to claim 1, wherein:

control means selects a program to be recorded and controls a recording timing on the basis of the information pertaining to recording reservation.

3. An apparatus according to claim 1, wherein:

information indicating whether the information pertaining to recording reservation is recorded is recorded on said recording medium, and said control means controls the execution of the reservation recording on the basis of the recorded information.

4. An apparatus according to claim 1, wherein:

information indicating whether the information pertaining to recording reservation is valid or invalid is recorded on said recording medium, and said control means controls the execution of the reservation recording on the basis of the recorded information.

5. A recording/playback apparatus for recording and reproducing information with respect to a recording medium, comprising:

control means for reading out information pertaining to recording reservation, which is recorded on said recording medium, and for executing reservation recording on the basis of the read out information, said control means including:

a) setting means for setting the information pertaining to recording reservation read out from said recording medium loaded in said apparatus;

b) executing means for executing the reservation recording on the basis of the information set by said setting means; and c) erasing means for erasing the information set by said setting means when said recording medium is unloaded from said apparatus.

6. A recording/playback apparatus for recording and reproducing information with respect to a recording medium, comprising:

control means for reading out information pertaining to recording reservation, which is recorded on said recording medium, and for executing reservation recording on the basis of the read out information, said control means including:

a) setting means for setting the information pertaining to recording reservation read out from said recording medium loaded in said apparatus;

b) executing means for executing the reservation recording on the basis of the information set by said setting means; and c) means for temporarily nullifying recording reservation information already set in said setting means when said setting means sets the information pertaining to recording reservation readout from said recording medium loaded in said apparatus, and again making the temporarily nullified recording reservation information valid when said recording medium is unloaded from said apparatus.

7. A recording/playback apparatus for recording and reproducing information with respect to a recording medium, comprising:

control means for reading out information pertaining to recording reservation, which is recorded on said recording medium, and for executing reservation recording on the basis of the read out information, said control means including:
  a) setting means for setting the information pertaining to recording reservation read out from said recording medium loaded in said apparatus;
  b) executing means for executing the reservation recording on the basis of the information set by said setting means; and
  c) means for giving priority to recording reservation information newly held in holding means if the information pertaining to recording reservation read out from said recording medium loaded in said apparatus duplicates recording reservation information already set in said setting means, when the information pertaining to recording reservation read out from said recording medium is set in said setting means.

8. An apparatus according to claim 1, wherein:

information indicating whether said recording medium is dedicated to a program designated by the information pertaining to recording reservation is recorded on said recording medium, and said control means controls the execution of the reservation recording on the basis of the recorded information.

9. An apparatus according to claim 1, further comprising:

recording means for forming the information pertaining to recording reservation and recording the information on said recording medium.

10. An apparatus according to claim 9, wherein:

if the information pertaining to recording reservation is not recorded on said recording medium, said recording means records information set by a normal recording operation by a user as a default value of recording reservation information on said recording medium.

* * * * *